(12) United States Patent
Tian et al.

(10) Patent No.: US 12,008,797 B2
(45) Date of Patent: Jun. 11, 2024

(54) IMAGE SEGMENTATION METHOD AND IMAGE PROCESSING APPARATUS

(71) Applicant: Huawei Technologies Co., Ltd., Shenzhen (CN)

(72) Inventors: Zhi Tian, Adelaide (AU); Tong He, Adelaide (AU); Chunhua Shen, Adelaide (AU); Youliang Yan, Shenzhen (CN); Songcen Xu, Shenzhen (CN); Yiren Zhou, London (GB); Xiaofei Wu, Shenzhen (CN); Jianzhuang Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 17/383,181

(22) Filed: Jul. 22, 2021

(65) Prior Publication Data
US 2021/0350168 A1 Nov. 11, 2021

Related U.S. Application Data

(63) Continuation of application No. PCT/CN2020/077366, filed on Mar. 1, 2020.

(30) Foreign Application Priority Data

Mar. 1, 2019 (CN) .......................... 201910157603.5

(51) Int. Cl.
*G06V 10/44* (2022.01)
*G06F 18/2135* (2023.01)
(Continued)

(52) U.S. Cl.
CPC ........ *G06V 10/457* (2022.01); *G06F 18/2135* (2023.01); *G06F 18/2137* (2023.01);
(Continued)

(58) Field of Classification Search
CPC ............. G06F 18/2135; G06F 18/2137; G06F 18/214; G06F 18/253; G06T 3/40
See application file for complete search history.

(56) References Cited

U.S. PATENT DOCUMENTS

| 11,580,622 B2* | 2/2023 | Fu .............................. G06T 7/13 |
| 2012/0191508 A1* | 7/2012 | Gross .................. G06Q 10/0637 |
| | | 705/7.36 |
| 2019/0057507 A1 | 2/2019 | El-Khamy et al. |

FOREIGN PATENT DOCUMENTS

| CN | 104794504 A | 7/2015 |
| CN | 106651877 A | 5/2017 |

(Continued)

OTHER PUBLICATIONS

"Snoopy_Dream, Deconvolution + Unsampling and UnPooling," Category Column: Computer Vision, total 12 pages (Nov. 2018). With English Version.

*Primary Examiner* — Diane D Mizrahi
(74) *Attorney, Agent, or Firm* — Leydig, Voit & Mayer, Ltd.

(57) ABSTRACT

This application discloses an image segmentation method in the field of artificial intelligence. The method includes: obtaining an input image and a processing requirement; performing multi-layer feature extraction on the input image to obtain a plurality of feature maps; downsampling the plurality of feature maps to obtain a plurality of feature maps with a reference resolution, where the reference resolution is less than a resolution of the input image; fusing the plurality of feature maps with the reference resolution to obtain at least one feature map group; upsampling the feature map group by using a transformation matrix W, to obtain a target feature map group; and performing target processing on the target feature map group based on the processing requirement to obtain a target image.

15 Claims, 13 Drawing Sheets

(51) Int. Cl.
  *G06F 18/2137* (2023.01)
  *G06F 18/214* (2023.01)
  *G06F 18/25* (2023.01)
  *G06N 3/08* (2023.01)
  *G06T 3/40* (2006.01)
  *G06V 10/77* (2022.01)
  *G06V 10/82* (2022.01)

(52) U.S. Cl.
  CPC .......... *G06F 18/214* (2023.01); *G06F 18/253* (2023.01); *G06N 3/08* (2013.01); *G06T 3/40* (2013.01); *G06V 10/454* (2022.01); *G06V 10/7715* (2022.01); *G06V 10/82* (2022.01)

(56) References Cited

FOREIGN PATENT DOCUMENTS

| | | |
|---|---|---|
| CN | 108010031 A | 5/2018 |
| CN | 108876793 A | 11/2018 |
| CN | 109034162 A | 12/2018 |
| CN | 110033003 A | 7/2019 |

* cited by examiner

IMAGE SEGMENTATION METHOD AND IMAGE PROCESSING APPARATUS

CROSS-REFERENCE TO RELATED APPLICATIONS

This application is a continuation of International Application No. PCT/CN2020/077366, filed on Mar. 1, 2020, which claims priority to Chinese Patent Application No. 201910157603.5, filed on Mar. 1, 2019. The disclosures of the aforementioned applications are hereby incorporated by reference in their entireties.

TECHNICAL FIELD

Embodiments of this application relate to the computer vision field, and in particular, to an image segmentation method and an image processing apparatus.

BACKGROUND

Computer vision is an integral part of various intelligent systems in various application fields such as a manufacturing, inspection, document analysis, medical diagnosis, and military affairs. The computer vision is a type of knowledge about how to use a camera/video camera and a computer to obtain required data and information of a photographed object. To be vivid, eyes (the camera/video camera) and a brain (an algorithm) are mounted on the computer to replace human eyes to identify, track, and measure a target, and the like, so that the computer can perceive an environment. The perceiving may be considered as extracting information from a perceptual signal. Therefore, the computer vision may also be considered as a science of studying how to make an artificial system perform "perceiving" from an image or multi-dimensional data. In conclusion, the computer vision is to replace a visual organ with various imaging systems to obtain an input image, and then replace a brain with the computer to process and interpret the input image. A final study objective of the computer vision is to make the computer observe and understand the world through vision in a way that human beings do, and have a capability of autonomously adapting to the environment.

Image semantic segmentation is an important part of image understanding in a computer vision technology. An accurate and efficient image semantic segmentation technology needs to be used in more application scenarios such as photographing, video playing, autonomous driving, indoor navigation, and even virtual reality and augmented reality. The image semantic segmentation is to precisely segment the input image to obtain a part that needs to be processed, and then perform corresponding processing on different parts obtained through segmentation. For example, a user may use a mobile terminal to photograph an image. Then, a portrait region in the photographed image is automatically obtained through segmentation, for adding a special effect, for example, adjusting a depth of field, changing a background, retaining only a color of the portrait region, or blurring an image region other than the portrait region.

Currently, a prevailing solution in the industry is to use a convolutional neural network (CNN) to process an image semantic segmentation task. In this solution, the CNN is used to encode (downsample) the input image, and perform decoding (upsampling) and fusion operations, to obtain a final image segmentation result. However, in this solution, feature maps with relatively high resolutions need to be fused, resulting in a large calculation amount and high memory overheads. A feature map with a higher resolution contains more parameters. Therefore, an image semantic segmentation solution with a relatively small calculation amount and relatively low memory overheads needs to be researched.

SUMMARY

Embodiments of this application provide an image segmentation method and an image processing apparatus, to perform information fusion on higher-layer feature maps. This can improve segmentation precision, and reduce a calculation amount and memory overheads.

According to a first aspect, an embodiment of this application provides an image segmentation method. The method includes: obtaining an input image and a processing requirement, where the processing requirement is used to indicate to perform target processing on a target feature map group obtained by performing image segmentation on the input image; performing multi-layer feature extraction on the input image to obtain a plurality of feature maps; downsampling the plurality of feature maps to obtain a plurality of feature maps with a reference resolution, where the reference resolution is less than a resolution of the input image; fusing the plurality of feature maps with the reference resolution to obtain at least one feature map group; upsampling the feature map group by using a transformation matrix $W$, to obtain the target feature map group, where the target feature map group has a same resolution as that of the input image, the transformation matrix $W$ is obtained by modeling training data of an image segmentation task, and one dimension of the transformation matrix $W$ is the same as a quantity of channels of the feature group; and performing the target processing on the target feature map group based on the processing requirement to obtain a target image.

In this embodiment of this application, a feature map group obtained by fusing feature maps with relatively low resolutions is upsampled by using the transformation matrix, to obtain a target feature map group. This can effectively reduce memory usage and a calculation amount, and achieve relatively high image segmentation precision.

In an optional implementation, the upsampling the feature map group by using a transformation matrix $W$, to obtain the target feature map group includes: calculating a product of the transformation matrix $W$ and each of $(H \times W)$ one-dimensional matrices that each include $C$ elements, to obtain $(H \times W)$ one-dimensional matrices that each include $P$ elements, where an element included in any one of the $(H \times W)$ one-dimensional matrices that each include $C$ elements is an element at a same location in each of $C$ two-dimensional $(H \times W)$ matrices included in the feature map group, $H$ and $W$ are two dimensions of the feature map group, $C$ is the quantity of channels of the feature map group, the transformation matrix is a two-dimensional $(C \times P)$ matrix obtained based on $M$ annotated images included in the training data, $P = A \times B \times N$, and $N$ is a quantity of categories into which image semantics in the $M$ annotated images are segmented; and separately performing feature permutation on the $(H \times W)$ one-dimensional matrices that each include $P$ elements, to obtain the target feature map group, where at least one $(A \times B \times N)$ submatrix included in the target feature map group is obtained based on one of the $(H \times W)$ one-dimensional matrices that each include $P$ elements, and $H$, $W$, $C$, $N$, $P$, $M$, $A$, and $B$ are all integers greater than 0.

In this implementation, a feature map group obtained by fusing feature maps with relatively low resolutions is upsampled by using the transformation matrix. In this way, an image segmentation result of the input image can be quickly obtained, and this operation is simple.

In an optional implementation, the separately performing feature permutation on the (H×W) one-dimensional matrices that each include P elements, to obtain the target feature map group includes: determining, based on any one of the (H×W) one-dimensional matrices that each include P elements, (A×B) one-dimensional matrices that each include N elements; and using, as a submatrix included in the target feature map group, a three-dimensional (A×B×N) matrix obtained based on the (A×B) one-dimensional matrices that each include N elements.

In this implementation, the target feature map group is obtained by performing the feature permutation on the (H×W) one-dimensional matrices that each include P elements. This can be easily implemented.

In an optional implementation, any one of the M annotated images is a three-dimensional (H×W×N) matrix, and the transformation matrix W is obtained by performing the following operations: obtaining at least one (A×B×N) submatrix corresponding to each of the M annotated images to obtain a plurality of (A×B×N) submatrices; obtaining, based on the plurality of (A×B×N) submatrices, a plurality of vectors including P elements, where a vector including P elements is obtained based on each of the plurality of (A×B×N) submatrices; performing principal component analysis on the plurality of vectors including P elements to obtain a two-dimensional (P×P) matrix; and using one (C×P) submatrix included in the two-dimensional (P×P) matrix as the transformation matrix W.

In this implementation, the transformation matrix is obtained by using the annotated images. In this way, the transformation matrix can be used to upsample a feature map group obtained by fusing feature maps with relatively low resolutions.

In an optional implementation, the performing multi-layer feature extraction on the input image to obtain a plurality of feature maps includes: performing a convolution operation on the input image to obtain a first feature map, and performing a convolution operation on a $(K-1)^{th}$ feature map to obtain a $K^{th}$ feature map, where the $K^{th}$ feature map is a feature map with the reference resolution, a resolution of the $(K-1)^{th}$ feature map is not greater than that of the $K^{th}$ feature map, K is an integer greater than 1, and the plurality of feature maps include K feature maps; and the downsampling the plurality of feature maps to obtain a plurality of feature maps with a reference resolution includes: downsampling the first feature map to obtain a feature map with the reference resolution, and downsampling the $(K-1)^{th}$ feature map to obtain a feature map with the reference resolution.

In this implementation, the plurality of feature maps with the reference resolution can be quickly obtained. This can be easily implemented.

In an optional implementation, the fusing the plurality of feature maps with the reference resolution to obtain at least one feature map group includes: stitching the plurality of feature maps with the reference resolution in a channel dimension to obtain the at least one feature map group, where the feature map group is a three-dimensional (H×W×C) matrix and corresponds to the C two-dimensional (H×W) matrices; and the calculating a product of the transformation matrix W and each of (H×W) one-dimensional matrices that each include C elements to obtain (H×W) one-dimensional matrices that each include P elements includes: calculating a product of the transformation matrix and a one-dimensional matrix corresponding to each element location in the feature map group, to obtain the (H×W) one-dimensional matrices that each include P elements, where an element included in a one-dimensional matrix corresponding to one element location in the feature map group is an element at a same element location in each of the C two-dimensional (H×W) matrices.

In this implementation, the product of the transformation matrix and the one-dimensional corresponding to each element location in the feature map group is calculated to obtain the (H×W) one-dimensional matrices that each include P elements, to obtain the target feature map group by performing the feature permutation on the (H×W) one-dimensional matrices that each include P elements. This operation is simple.

In an optional implementation, the method further includes: obtaining the transformation matrix W; processing a training sample by using a convolutional neural network, to obtain an image segmentation result of the training sample, where the training sample is included in the training data; determining, based on the image segmentation result of the training sample and a standard result corresponding to the training sample, a loss corresponding to the training sample, where the standard result is a result expected to be obtained by processing the training sample by using the convolutional neural network; and updating a parameter of the convolutional neural network by using an optimization algorithm and the loss corresponding to the training sample; and the performing multi-layer feature extraction on the input image to obtain a plurality of feature maps includes: inputting the input image into the convolutional neural network and performing the multi-layer feature extraction, to obtain the plurality of feature maps.

In this implementation, the convolutional neural network is obtained through training, to perform the multi-layer feature extraction on the input image by using the convolutional neural network, to obtain the plurality of feature maps.

According to a second aspect, an embodiment of this application provides an image processing apparatus. The image processing apparatus includes: an obtaining unit, configured to obtain an input image and a processing requirement, where the processing requirement is used to indicate to perform target processing on a target feature map group obtained by performing image segmentation on the input image; and a processing unit, configured to: perform multi-layer feature extraction on the input image to obtain a plurality of feature maps; downsample the plurality of feature maps to obtain a plurality of feature maps with a reference resolution, where the reference resolution is less than a resolution of the input image; fuse the plurality of feature maps with the reference resolution to obtain at least one feature map group; upsample the feature map group by using a transformation matrix W, to obtain the target feature map group, where the target feature map group has a same resolution as that of the input image, the transformation matrix W is obtained by modeling training data of an image segmentation task, and one dimension of the transformation matrix W is the same as a quantity of channels of the feature group; and perform the target processing on the target feature map group based on the processing requirement to obtain a target image.

In an optional implementation, the processing unit is specifically configured to: calculate a product of the transformation matrix W and each of (H×W) one-dimensional matrices that each include C elements, to obtain (H×W) one-dimensional matrices that each include P elements, where an element included in any one of the (H×W) one-dimensional matrices that each include C elements is an element at a same location in each of C two-dimensional (H×W) matrices included in the feature map group, H and W are two dimensions of the feature map group, C is the quantity of channels of the feature map group, the transformation matrix is a two-dimensional (C×P) matrix obtained based on M annotated images included in the training data, P=A×B×N, and N is a quantity of categories into which image semantics in the M annotated images are segmented; and separately perform feature permutation on the (H×W) one-dimensional matrices that each include P elements, to obtain the target feature map group, where at least one (A×B×N) submatrix included in the target feature map group is obtained based on one of the (H×W) one-dimensional matrices that each include P elements, and H, W, C, N, P, M, A, and B are all integers greater than 0.

In an optional implementation, the processing unit is specifically configured to: determine, based on any one of the (H×W) one-dimensional matrices that each include P elements, (A×B) one-dimensional matrices that each include N elements; and use, as a submatrix included in the target feature map group, a three-dimensional (A×B×N) matrix obtained based on the (A×B) one-dimensional matrices that each include N elements.

In an optional implementation, any one of the M annotated images is a three-dimensional (H×W×N) matrix; and the processing unit is configured to: obtain at least one (A×B×N) submatrix corresponding to each of the M annotated images, to obtain a plurality of (A×B×N) submatrices; obtain, based on the plurality of (A×B×N) submatrices, a plurality of vectors including P elements, where a vector including P elements is obtained based on each of the plurality of (A×B×N) submatrices; perform principal component analysis on the plurality of vectors including P elements to obtain a two-dimensional (P×P) matrix; and use one (C×P) submatrix included in the two-dimensional (P×P) matrix as the transformation matrix W.

In an optional implementation, the processing unit is specifically configured to: perform a convolution operation on the input image to obtain a first feature map, and perform a convolution operation on a $(K-1)^{th}$ feature map to obtain a $K^{th}$ feature map, where the $K^{th}$ feature map is a feature map with the reference resolution, a resolution of the $(K-1)^{th}$ feature map is not greater than that of the $K^{th}$ feature map, K is an integer greater than 1, and the plurality of feature maps include K feature maps; and downsample the first feature map to obtain a feature map with the reference resolution, and downsample the $(K-1)^{th}$ feature map to obtain a feature map with the reference resolution.

In an optional implementation, the processing unit is specifically configured to: stitch the plurality of feature maps with the reference resolution in a channel dimension to obtain the at least one feature map group, where the feature map group is a three-dimensional (H×W×C) matrix and corresponds to the C two-dimensional (H×W) matrices; and calculate a product of the transformation matrix and a one-dimensional matrix corresponding to each element location in the feature map group, to obtain the (H×W) one-dimensional matrices that each include P elements, where an element included in a one-dimensional matrix corresponding to one element location in the feature map group is an element at a same element location in each of the C two-dimensional (H×W) matrices.

In an optional implementation, the processing unit is further configured to: obtain the transformation matrix W; process a training sample by using a convolutional neural network, to obtain an image segmentation result of the training sample, where the training sample is included in the training data; determine, based on the image segmentation result of the training sample and a standard result corresponding to the training sample, a loss corresponding to the training sample, where the standard result is a result expected to be obtained by processing the training sample by using the convolutional neural network; and update a parameter of the convolutional neural network by using an optimization algorithm and the loss corresponding to the training sample; and the processing unit is specifically configured to input the input image into the convolutional neural network and perform the multi-layer feature extraction, to obtain the plurality of feature maps.

According to a third aspect, an embodiment of this application provides another image processing apparatus, including a processor and a memory. The processor and the memory are connected to each other, the memory is configured to store a computer program, the computer program includes a program instruction, and the processor is configured to invoke the program instruction to perform the method in the first aspect.

According to a fourth aspect, an embodiment of this application provides a computer-readable storage medium. The computer storage medium stores a computer program, the computer program includes a program instruction, and when the program instruction is executed by a processor, the processor is enabled to perform the method in the first aspect.

DESCRIPTION OF EMBODIMENTS

Figure 1:
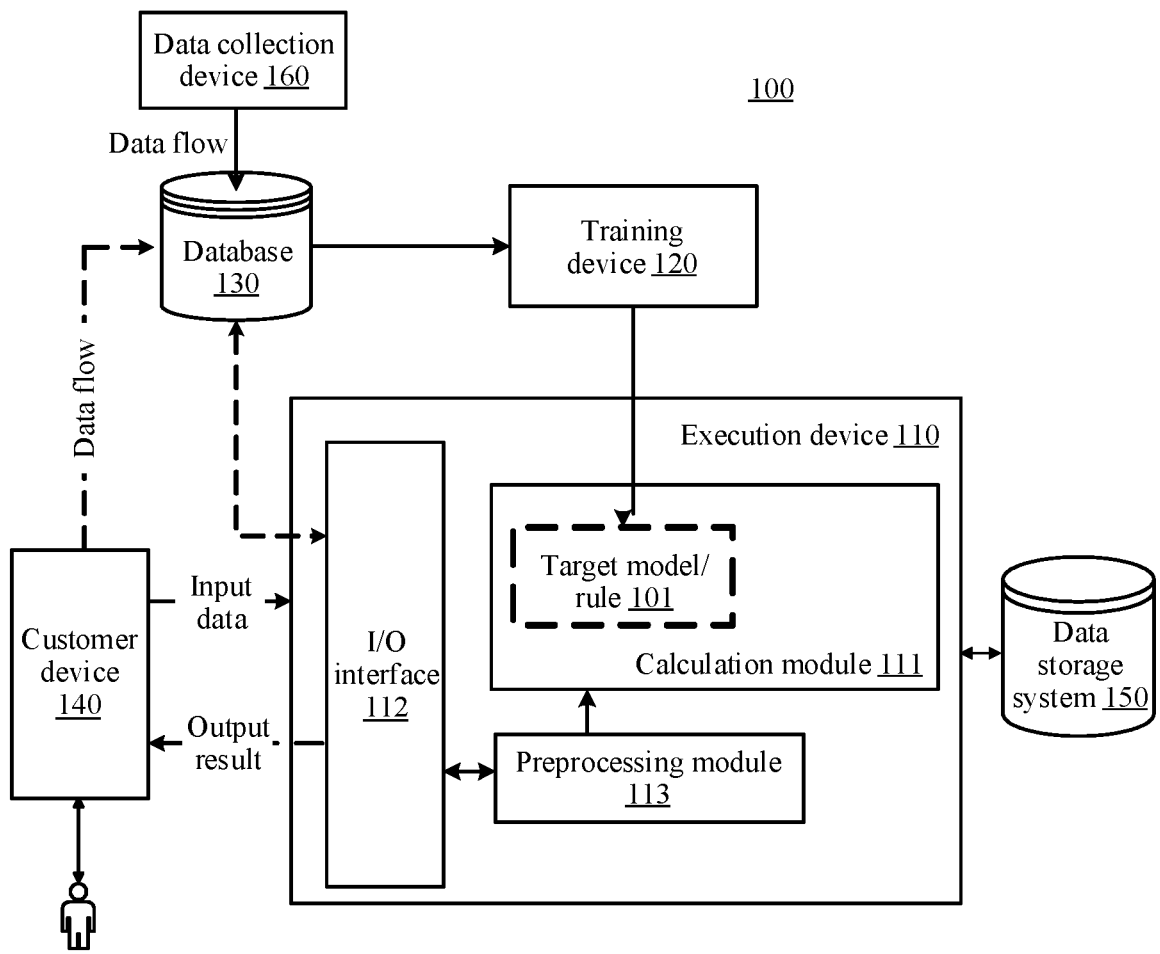
FIG. 1 is a schematic diagram of a system architecture according to an embodiment of this application.

The following describes technical solutions of this application with reference to accompanying drawings.

Image semantic segmentation is to precisely segment a to-be-processed image to obtain a part that needs to be processed, and then perform corresponding processing on different parts obtained through segmentation. An image segmentation method provided in the embodiments of this application can be applied to scenarios such as photographing, video shooting, and autonomous driving. The following separately and simply describes application of the image segmentation method provided in the embodiments of this application in the photographing scenario, the video shooting scenario, and the autonomous driving scenario.

In a photographing scenario, a user uses a mobile terminal (for example, a mobile phone) to photograph an image. The mobile terminal automatically obtains a target object (for example, a portrait) in the photographed image through segmentation, for adding a special effect, for example, adjusting a depth of field, changing a background, retaining only a color of a region in which the target object is located, or blurring an image region other than the region in which the target object is located. For example, a user performs real-time image semantic segmentation on a collected image by using a camera function of a mobile terminal. This makes a foreground of a photographed object clear and a background blurred, to implement single-lens reflex bokeh. For another example, after using a mobile terminal to photograph an image, a user may select a portrait whose color needs to be retained. The mobile terminal retains only a color of a region in which the portrait in the image is located. For another example, after a user uses a mobile terminal to photograph an image, the mobile terminal automatically obtains a target object (for example, a portrait) in the photographed image through segmentation. In this way, the user can adjust a region, in the image, other than a region in which the target object is located, for example, adjust a depth of field, or change a background.

In a video shooting scenario 1, a user enables a video shooting function of a mobile terminal. In a video shooting process, image semantic segmentation is performed in real time, and after a portrait region is obtained through segmentation, only a color of the portrait region is retained. In this way, a color of a portrait in a video is retained.

In a video shooting scenario 2, a user enables a video shooting function of a mobile terminal. When there are a plurality of photographed persons, all portraits are obtained through segmentation. The user may randomly select a clear target portrait that needs to be retained, and the mobile terminal blurs each part, in the image, other than a region in which the target portrait is located, to implement a movie mode.

In an autonomous driving scenario, an autonomous driving apparatus (for example, an automobile) performs image semantic segmentation on a collected image in real time, segments the image to obtain each object in the image, and then performs object detection on each obtained object, to more accurately identify a traveler, an obstacle, a vehicle, and the like.

In the foregoing scenarios, the mobile terminal uses lower-resolution feature maps for feature map fusion. This improves image semantic segmentation precision, and greatly reduces a calculation amount and memory usage.

The following describes, from a model training side and a model application side, the method provided in this application.

A method for training a convolutional neural network in the embodiments of this application relates to processing related to computer vision, and may be specifically applied to image processing methods such as data training, machine learning, and deep learning, to perform symbolic and formal intelligent information modeling, extraction, preprocessing, training, and the like on training data (for example, an input image in this application), and finally obtain a trained convolutional neural network. In addition, the trained convolutional neural network may be applied to the image segmentation method provided in the embodiments of this application, and input data (for example, the input image in this application) is input into the trained convolutional neural network, to obtain output data (for example, an image segmentation result in this application). It should be noted that the method for training a convolutional neural network and the image segmentation method that are provided in the embodiments of this application are inventions generated based on a same concept, and may also be understood as two parts of a system, or two stages of an entire process, for example, a model training stage and a model application stage.

The embodiments of this application relate to mass application of the convolutional neural network. For ease of understanding, the following first describes related concepts such as a related term and the convolutional neural network in the embodiments of this application.

(1) A convolutional neural network is a deep convolutional neural network with a convolutional structure. The convolutional neural network includes a feature extractor constituted by a convolutional layer and a sub sampling layer. The feature extractor may be considered as a filter. A convolution process may be considered as using a trainable filter to perform convolution on an input image or a convolutional feature plane, to output a convolutional feature plane. The convolutional feature plane may also be referred to as a feature map. The convolutional layer is a neuron layer that is in the convolutional neural network and that performs convolution processing on an input signal. At the convolutional layer in the convolutional neural network, one neuron may be connected only to some adjacent-layer neurons. One convolutional layer usually includes several feature planes, and each feature plane may include some rectangularly-arranged neurons. Neurons in a same feature plane share a weight, and a weight matrix corresponding to the weight shared herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, same learned image information can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by the weight sharing is that connections between layers of the convolutional neural network are reduced and an overfitting risk is lowered.

(2) Loss Function

In a process of training a convolutional neural network, because it is expected that an output of the convolutional neural network is maximally close to a value that actually wants to be predicted, a current predicted value of the network and an actually desired target value may be compared, and then a weight vector of each layer of the convolutional neural network is updated based on a difference between the predicted value and the target value (certainly, there is usually an initialization process before the first update, to be specific, parameters are preconfigured for all the layers of the convolutional neural network). For example, if the predicted value of the network is large, the weight vector is adjusted to lower the predicted value, and the adjustment is continuously performed until the convolutional neural network can predict the actually desired target value or a value that is very close to the actually desired target value. Therefore, "how to obtain, through comparison, a difference between a predicted value and a target value" needs to be predefined. This is the loss function or an objective function. The loss function and the objective function are important equations used to measure the difference between the predicted value and the target value. The loss function is used as an example. A larger output value (loss) of the loss function indicates a larger difference. Therefore, the training for the convolutional neural network becomes a process of minimizing the loss as much as possible.

(3) Back Propagation Algorithm

A convolutional neural network may correct a value of a parameter in the convolutional neural network in a training process by using an error back propagation (back propagation, BP) algorithm, so that an error loss between a predicted value output by the convolutional neural network and an actually desired target value is increasingly small. Specifically, an input signal is transferred forward until an error loss occurs at an output, and the parameter in the initial convolutional neural network is updated by using back propagation error loss information, to make the error loss converge. The back propagation algorithm is a back propagation motion dominated by an error loss, and is intended to obtain an optimal parameter of the convolutional neural network, for example, a weight matrix, namely, a convolution kernel of a convolutional layer.

The following describes a system architecture provided in the embodiments of this application.

Referring to FIG. 1, an embodiment of the present application provides a system architecture 100. As shown in the system architecture 100, a data collection device 160 is configured to collect training data. In this embodiment of this application, the training data includes one or more annotated images (namely, training samples) and real results corresponding to the one or more annotated images, namely, ideal results expected to be obtained by processing the one or more annotated images by using a convolutional neural network. The training data may be stored into a database 130. A training device 120 may obtain a target model/rule 101 (101 is a model obtained through training at the training stage described above, and may be a convolutional neural network used to perform an image voice segmentation operation) through training based on training data maintained in the database 130. One annotated image corresponds to one real result, namely, a ground truth. The following Embodiment 1 describes in more detail how the training device 120 obtains the target model/rule 101 based on the training data. The target model/rule 101 can be used to implement the image voice segmentation method provided in the embodiments of this application, that is, image information obtained by performing related preprocessing on an input image is input into the target model/rule 101, to obtain an image segmentation result. The target model/rule 101 in this embodiment of this application may specifically be a convolutional neural network obtained through training. In this embodiment provided in this application, the convolutional neural network is obtained by training an initialized convolutional neural network. It should be noted that, in actual application, the training data maintained in the database 130 is not necessarily all collected by the data collection device 160, and may be received from another device. In addition, it should be noted that the training device 120 does not necessarily perform training completely based on the training data maintained in the database 130 to obtain the target model/rule 101, and may obtain training data from a cloud or another place to perform model training. The foregoing description shall not be construed as a limitation on this embodiment of this application.

The target model/rule 101 obtained by the training device 120 through training may be applied to different systems or devices, for example, applied to an execution device 110 shown in FIG. 1. The execution device 110 may be a terminal, such as a mobile phone terminal, a tablet computer, a notebook computer, an augmented reality (AR) device, a virtual reality (VR) device, or a vehicle-mounted terminal, or may be a server or the like. In FIG. 1, an I/O interface 112 is configured on the execution device 110 and is configured to exchange data with an external device. A user may input data into the I/O interface 112 by using a customer device 140. In this embodiment of this application, the input data may include an input image. The input image may be an image collected by the execution device 110 by using the data collection device 160, may be an image in the database 130, or may be an image from the customer device 140.

A preprocessing module 113 is configured to perform preprocessing based on the input data (for example, the input image) received by the I/O interface 112. In this embodiment of this application, the preprocessing module 113 may be configured to implement one or more of the following operations: image filtering, image enhancement, image smoothing, image restoration, and the like; and is further configured to implement another preprocessing operation. This is not limited in this application.

In a related processing procedure in which the execution device 110 preprocesses the input data or a calculation module 111 of the execution device 110 performs calculation, the execution device 110 may invoke data, code, and the like in a data storage system 150 to implement corresponding processing, and may also store, into the data storage system 150, data, an instruction, and the like obtained through corresponding processing.

Finally, the I/O interface 112 returns a processing result, for example, the foregoing obtained image processing result, to the customer device 140, to provide the processing result for the user.

It should be noted that the training device 120 may obtain, through training based on different training data, corresponding target models/rules 101 for different targets that are alternatively referred to as different tasks. The corresponding target models/rules 101 may be used to implement the foregoing targets or complete the foregoing tasks, to provide a required result for the user.

In a case shown in FIG. 1, the user may manually provide the input data. The manually providing may be performed by using a screen provided on the I/O interface 112. In another case, the customer device 140 may automatically send the input data to the I/O interface 112. If it is required that the customer device 140 need to obtain authorization from the user to automatically send the input data, the user may set corresponding permission on the customer device 140. The user may view, on the customer device 140, a result output by the execution device 110. Specifically, the result may be displayed or may be presented in a form of sound, an action, or the like. The customer device 140 may also be used as a data collection end to collect the input data that is input into the I/O interface 112 and an output result that is output from the I/O interface 112, as shown in the figure, use the input data and the output result as new sample data, and store the new sample data into the database 130. Certainly, alternatively, the customer device 140 may not perform collection, and the I/O interface 112 directly stores, into the database 130 as new sample data, the input data that is input into the I/O interface 112 and an output result that is output from the I/O interface 112, as shown in the figure.

It should be noted that FIG. 1 is merely a schematic diagram of a system architecture provided in an embodiment of the present application. A location relationship between a device, a component, a module, and the like shown in the figure constitutes no limitation. For example, in FIG. 1, the data storage system 150 is an external memory relative to the execution device 110. In another case, the data storage system 150 may be alternatively disposed in the execution device 110. In this application, the target model/rule 101 obtained through training based on the training data may be a convolutional neural network used for an image voice segmentation task.

As described in the foregoing basic concepts, the convolutional neural network is a deep convolutional neural network with a convolutional structure, and is a deep learning architecture. In the deep learning architecture, multilayer learning is performed at different abstract levels by using a machine learning algorithm. As the deep learning architecture, the CNN is a feed-forward artificial convolutional neural network. Neurons in the feed-forward artificial convolutional neural network can respond to images input into the neurons.

Figure 2:
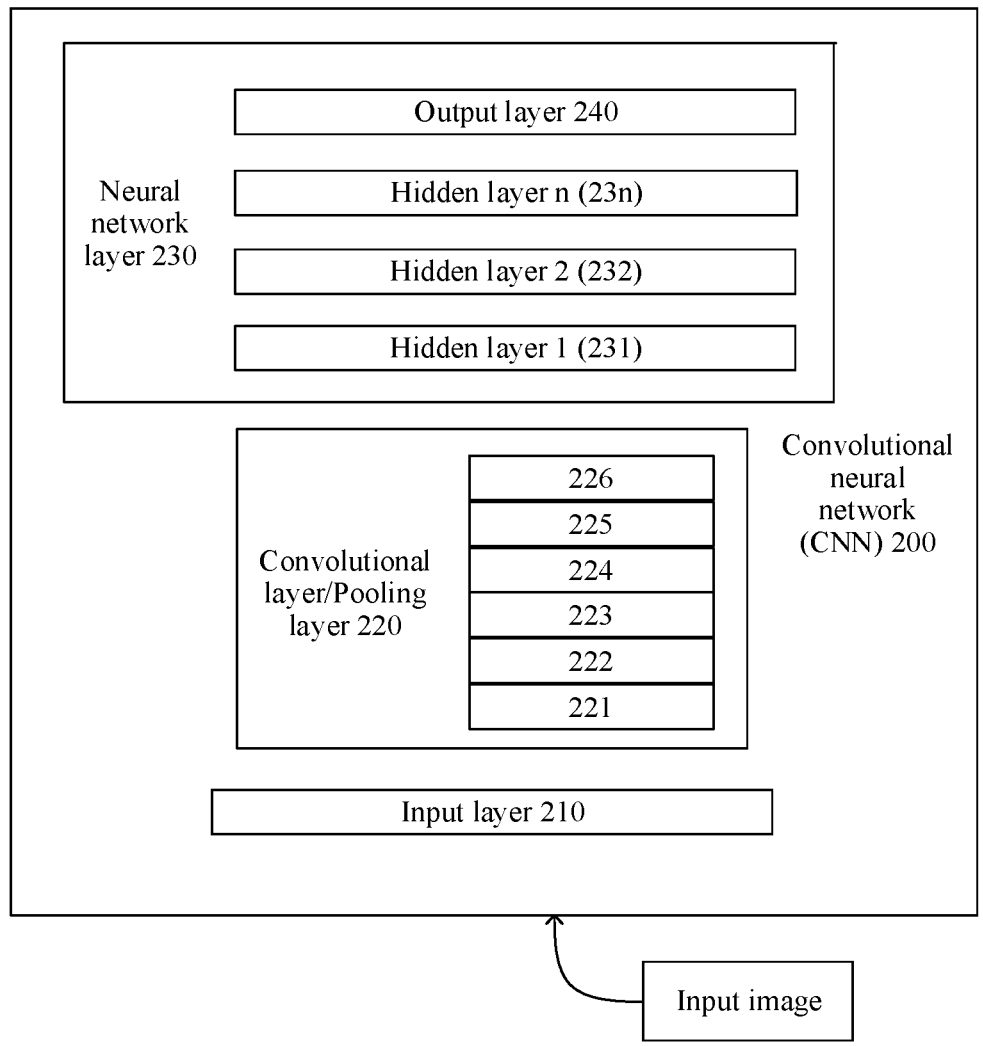
FIG. 2 is a schematic diagram of a convolutional neural network according to an embodiment of this application.

As shown in FIG. 2, a convolutional neural network (CNN) 200 may include an input layer 210, a convolutional layer/pooling layer 220 (where the pooling layer is optional), and a convolutional neural network layer 230.

Convolutional Layer/Pooling Layer 220:

Convolutional Layer:

As shown in FIG. 2, the convolutional layer/pooling layer 220 may include layers 221 to 226. For example, in an implementation, a layer 221 is a convolutional layer, a layer 222 is a pooling layer, a layer 223 is a convolutional layer, a layer 224 is a pooling layer, a layer 225 is a convolutional layer, and a layer 226 is a pooling layer. In another implementation, layers 221 and 222 are convolutional layers, a layer 223 is a pooling layer, layers 224 and 225 are convolutional layers, and a layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a convolution kernel. In image processing, the convolution operator is equivalent to a filter that extracts specific information from an input image matrix. The convolution operator may essentially be a weight matrix. The weight matrix is usually predefined, and depends on a value of a stride in a process of performing a convolution operation on an image. The weight matrix usually processes pixels at a granularity level of one pixel or two pixels in a horizontal direction on the input image, to extract a specific feature from the image. A size of the weight matrix needs to be related to a size of the image. It should be noted that a depth dimension of the weight matrix is the same as that of the input image. In a convolution operation process, the weight matrix extends to an entire depth of the input image. The depth dimension is a channel dimension, and corresponds to a quantity of channels. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "a plurality of". Different weight matrices may be used to extract different features from an image. For example, one weight matrix is used to extract edge information of the image, another weight matrix is used to extract a specific color of the image, and a further weight matrix is used to blur unneeded noise in the image. The plurality of weight matrices have the same size (rows x columns). Sizes of feature maps extracted by using the plurality of weight matrices with the same size are also the same, and then the plurality of extracted feature maps with the same size are combined to form an output of a convolution operation.

Weight values in these weight matrices need to be obtained through a lot of training in actual application. Each weight matrix formed by using the weight values obtained through training may be used to extract information from an input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature and corresponds to a high-resolution feature map. As a depth of the convolutional neural network 200 increases, a feature extracted at a subsequent convolutional layer (for example, 226) becomes more complex, for example, a high-level semantic feature, and corresponds to a low-resolution feature map. A feature with higher semantics is more applicable to a to-be-resolved problem.

Pooling Layer:

A quantity of training parameters often needs to be reduced. Therefore, a pooling layer often needs to be periodically introduced after a convolutional layer. For the layers 221 to 226 shown in 220 in FIG. 2, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, and may be configured to sample an input image to obtain a smaller image, and may be further configured to sample a feature map input by the convolutional layer to obtain a smaller feature map. The average pooling operator may be used to calculate pixel values in an image in a specific range, to generate an average value. The average value is used as an average pooling result. The maximum pooling operator may be used to select a pixel with a maximum value in a specific range as a maximum pooling result. In addition, similar to that a size of a weight matrix at the convolutional layer needs to be related to a size of an image, an operator at the pooling layer also needs to be related to a size of an image. A size of a processed image output from the pooling layer may be less than a size of an image input into the pooling layer. Each pixel in the image output from the pooling layer represents an average value or a maximum value of a corresponding sub-region of the image input into the pooling layer.

Convolutional Neural Network Layer 230:

After processing performed by the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (an image segmentation result or other related information), the convolutional neural network 200 needs to generate the image segmentation result by using the convolutional neural network layer 230. Therefore, the convolutional neural network layer 230 may include a plurality of hidden layers (231, 232, . . . , and 23n shown in FIG. 2) and an output layer 240. Parameters included in the plurality of hidden layers may be obtained through pre-training based on related training data of a specific task type. For example, the task type may include image semantic segmentation, image classification, and super-resolution image reconstruction. The hidden layer may perform a series of processing on a feature map output from the convolutional layer/pooling layer 220 to obtain the image segmentation result. A process of obtaining the image segmentation result based on the feature map output from the convolutional layer/pooling layer 220 will be subsequently described in detail, and details are not described herein.

At the convolutional neural network layer 230, the plurality of hidden layers are followed by the output layer 240, namely, the last layer of the entire convolutional neural network 200. The output layer 240 has a loss function similar to classification cross entropy, and the loss function is specifically used to calculate a prediction error. Once forward propagation (propagation in a direction from 210 to 240, as shown in FIG. 2) of the entire convolutional neural network 200 is completed, reverse propagation (propagation in a direction from 240 to 210, as shown in FIG. 2) is started to update a weight value and a deviation of each layer mentioned above, to reduce a loss of the convolutional neural network 200 and an error between a result (namely, the foregoing image processing result) output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

The following describes a hardware structure of a chip provided in an embodiment of this application.

Figure 3:
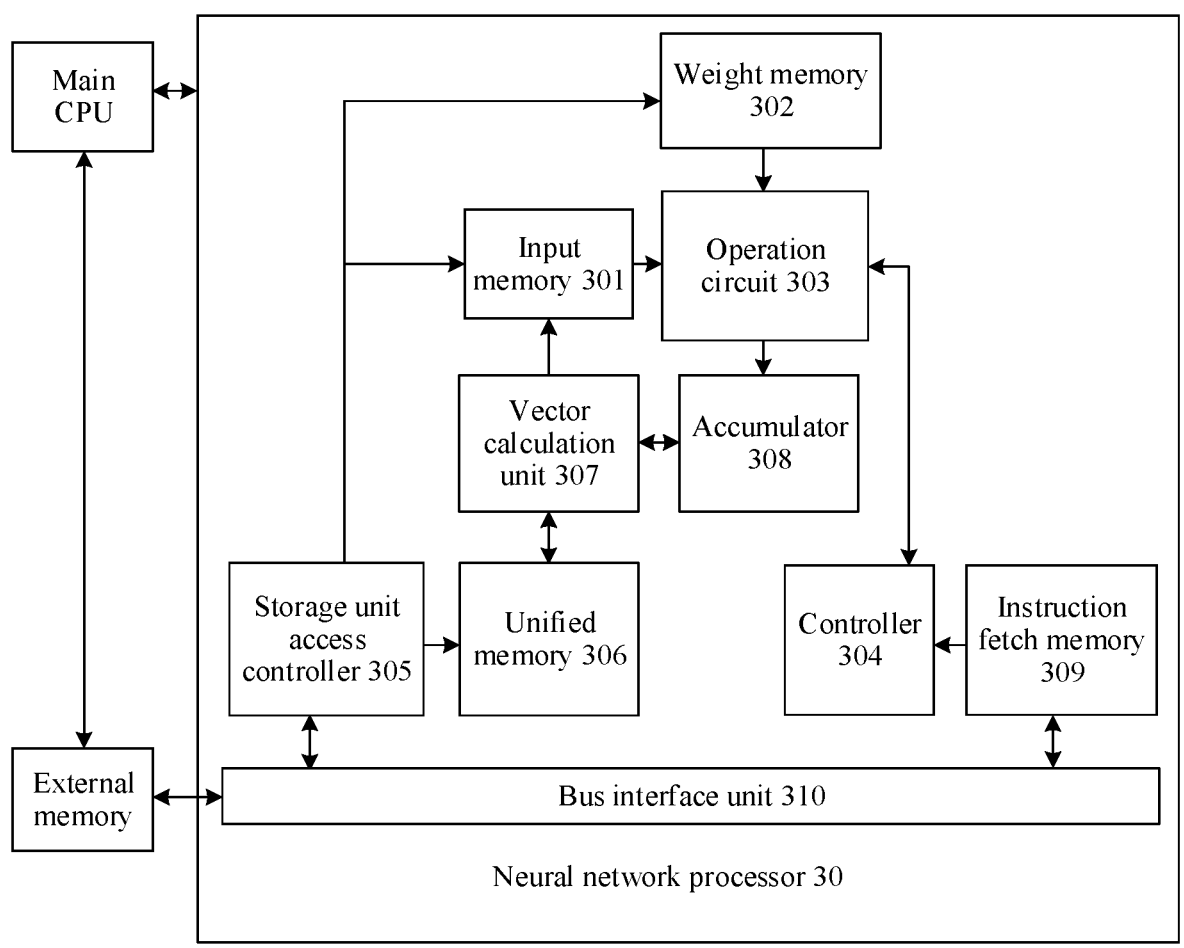
FIG. 3 shows a hardware structure of a chip according to an embodiment of this application.

FIG. 3 is a hardware structure of a chip according to an embodiment of the present application. The chip includes a convolutional neural network processor 30. The chip may be disposed in the execution device 110 shown in FIG. 1, to complete calculation work of the calculation module 111. The chip may be alternatively disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The convolutional neural network processor 30 may be any processor suitable for large-scale exclusive OR operation processing, for example, a convolutional neural-network processing unit (NPU), a tensor processing unit (TPU), or a graphics processing unit (GPU). The NPU is used as an example. The NPU may be mounted, as a coprocessor, onto a central processing unit (CPU), namely, a host CPU, and the host CPU allocates a task, such as an image processing task, to the NPU. A core part of the NPU is an operation circuit 303. The operation circuit 303 is controlled by a controller 304 to extract matrix data from memories (301 and 302) and perform multiplication and addition.

In some implementations, the operation circuit 303 internally includes a plurality of processing engines (process engine, PE). In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there are an input matrix A, a weight matrix B, and an output matrix C. The operation circuit 303 obtains a weight value of the matrix B from the weight memory 302, and buffers the weight value of the matrix B on each PE in the operation circuit 303. The operation circuit 303 obtains input data of the matrix A from the input memory 301, and performs a matrix operation based on the input data of the matrix A and the weight value of the matrix B, and an obtained partial result or final result of the matrix is stored into an accumulator 308. The input data may be an input image, and the weight matrix is a convolution kernel. Weight data may also be referred to as a weight matrix.

A unified memory 306 is configured to store the input data and output data. The weight matrix is directly transferred to the weight memory 302 by using a storage unit access controller (direct memory access controller, DMAC) 305. The input data is also transferred to the unified memory 306 by using the DMAC. The output data is an image segmentation result.

A bus interface unit (BIU) 310 is used for interaction between the DMAC and an instruction fetch buffer 309. The bus interface unit 301 is further used by the instruction fetch buffer 309 to obtain an instruction from an external memory. The bus interface unit 301 is further used by the storage unit access controller 305 to obtain original data of the input matrix A or the weight matrix B from the external memory.

The DMAC is mainly configured to transfer input data in an external memory DDR to the unified memory 306, or transfer the weight data to the weight memory 302, or transfer the input data to the input memory 301.

A vector calculation unit 307 may include a plurality of operation processing engines. If required, further processing is performed on an output of the operation circuit 303, such as vector multiplication, vector addition, an exponential operation, a logarithmic operation, and size comparison. The vector calculation unit 307 is mainly used for calculation at a non-convolutional layer or a fully connected layer (FC) of the convolutional neural network, and may specifically perform calculation in pooling, normalization, and the like. For example, the vector calculation unit 307 may apply a non-linear function to the output of the operation circuit 303, for example, a vector of an accumulated value, to generate an active value. In some implementations, the vector calculation unit 307 generates a normalized value, a combined value, or both a normalized value and a combined value.

In some implementations, the vector calculation unit 307 stores a processed vector into the unified memory 306. In some implementations, the vector processed by the vector calculation unit 307 can be used as an active input of the operation circuit 303, for example, for use at a subsequent layer in the convolutional neural network. As shown in FIG. 2, if a current processing layer is a hidden layer 1 (231), the vector processed by the vector calculation unit 307 can also be used for calculation at a hidden layer 2 (232).

The instruction fetch buffer 309 connected to the controller 304 is configured to store an instruction used by the controller 304.

The unified memory 306, the input memory 301, the weight memory 302, and the instruction fetch buffer 309 are all on-chip memories. The external memory may be independent of the NPU hardware architecture.

Operations at the layers in the convolutional neural network shown in FIG. 2 may be performed by the operation circuit 303 or the vector calculation unit 307.

The following Embodiment 1 describes in more detail how the training device 120 obtains the target model/rule 101 based on training data, to be specific, how a convolutional neural network for implementing the image segmentation method provided in the embodiments of this application is obtained through training based on the training data.

Embodiment 1

Figure 4:
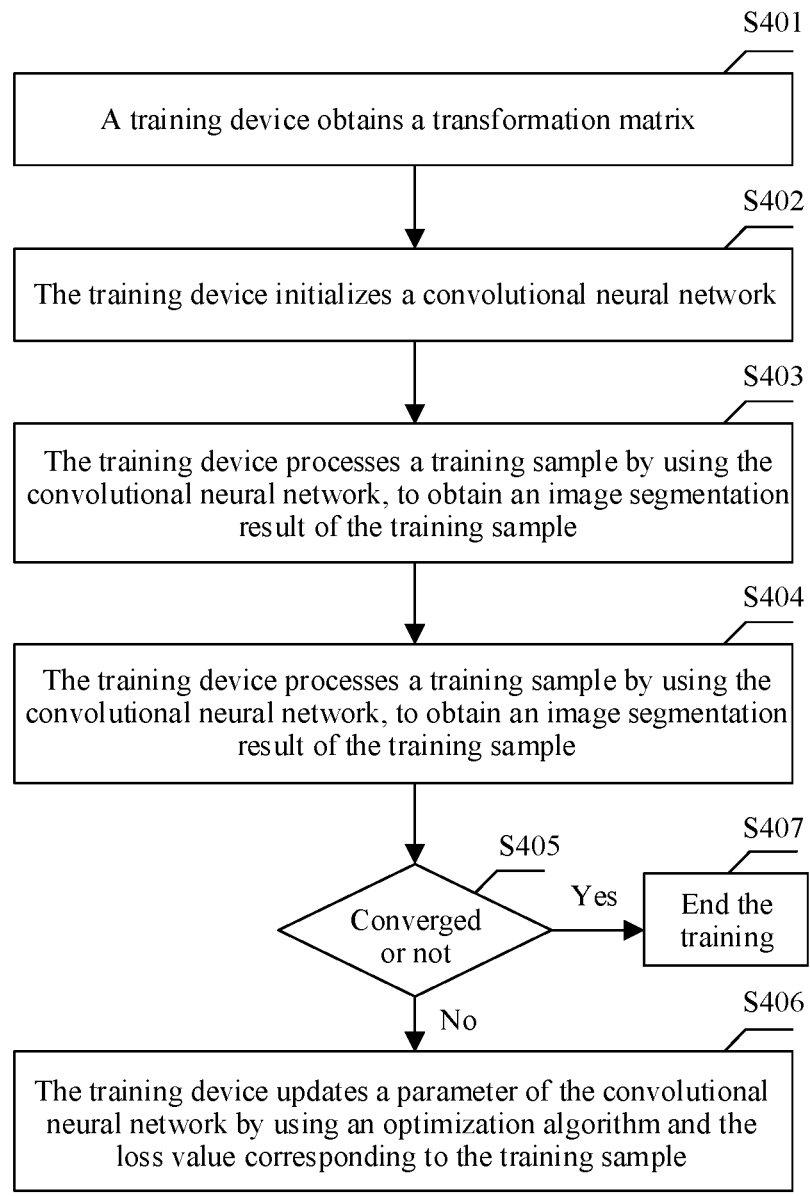
FIG. 4 is a flowchart of a method for training a convolutional neural network according to an embodiment of this application.

FIG. 4 shows a method 400 for training a convolutional neural network according to Embodiment 1 of the present application. The method may include the following steps.

S401: A training device obtains a transformation matrix.

The training device needs to use the transformation matrix in S403. Therefore, the training device needs to obtain the transformation matrix. The training device may obtain the transformation matrix from a database 130, may obtain the transformation matrix from another device, or may obtain the transformation matrix based on a training sample. A method for obtaining the transformation matrix based on the training sample will be subsequently described in detail.

S402: The training device initializes a convolutional neural network.

Initializing the convolutional neural network includes initializing convolution kernels of convolutional layers of the convolutional neural network and parameters of other layers (for example, a pooling layer, a convolutional neural network layer, and a fully connected layer) of the convolutional neural network. The training device may initialize the convolutional neural network by using any initialization method, for example, by using a method such as Gaussian distribution random number sampling or uniform distribution random number sampling.

S403: The training device processes the training sample by using the convolutional neural network, to obtain an image segmentation result of the training sample.

The image segmentation result of the training sample is used to indicate a region in which a target object in the training sample is located. The training sample may be understood as an input image. The processing performed by the training device on the training sample by using the convolutional neural network is the same as that performed by an execution device on the input image by using the convolutional neural network. The following will describe in detail a process in which the execution device processes the input image by using the convolutional neural network. A process in which the training device processes the training sample by using the convolutional neural network is not described in detail herein. Optionally, before processing the training sample by using the convolutional neural network, the training device may further preprocess the training sample. For example, image filtering, image enhancement, image smoothing, and image restoration are performed on the training sample. An image processing apparatus may further perform other image preprocessing operations on the training sample. This is not limited in this application. The image filtering mainly includes: adjusting a size of the image, and performing denoising and smoothing on noise in a scaled image. The image enhancement is selectively enhancing and suppressing information in the image to improve a visual effect of the image, or transforming the image into a form more suitable for machine processing, to facilitate data extraction or recognition. The image smoothing is removing random noise from the image. The image restoration is correcting image degradation resulting from various causes, so that a reconstructed image or an estimated image maximally approaches an ideal non-degraded image.

S404: The training device determines, based on the image segmentation result of the training sample and a standard result corresponding to the training sample, a loss value corresponding to the training sample.

The standard result (also referred to as a real result) corresponding to the training sample is a result expected to be obtained by processing the training sample by using the convolutional neural network. The training device may calculate, by using a loss function corresponding to an image semantic segmentation task performed by the convolutional neural network, the loss value corresponding to the training sample. As described in the foregoing basic concepts, the loss function defines "how to obtain, through comparison, a difference between a predicted value and a target value", in other words, the loss function is an important equation used to measure the difference between the predicted value and the target value. In this embodiment of this application, the image segmentation result of the training sample corresponds to the predicted value, and the standard result of the training sample corresponds to the target value. A larger output value (loss) of the loss function indicates a larger difference between the image segmentation result and the standard result. Therefore, training for the convolutional neural network becomes a process of minimizing the loss as much as possible.

S405: The training device determines whether the convolutional neural network converges.

If the convolutional neural network converges, S407 is performed; if the convolutional neural network does not converge, S406 is performed. The determining, by the training device, whether the convolutional neural network converges may be determining whether a quantity of times of updating a parameter of the convolutional neural network reaches an iteration threshold, namely, a quantity of times of performing S406; or may be determining whether a loss value of the convolutional neural network is less than a loss threshold. The loss value of the convolutional neural network is an error that is between an image segmentation result output by the convolutional neural network and a standard result and that is calculated by the training device by using a loss function of the convolutional neural network. The loss function of the convolutional neural network varies with a training task of the training device. The iteration threshold may be a quantity of iterations that is preset by the training device, for example, 10,000 or 20,000. The loss threshold may be preset by the training device. If a difference between an image processing result output by the convolutional neural network and a standard result is less than the loss threshold, the training ends.

S406: The training device updates the parameter of the convolutional neural network by using an optimization algorithm and the loss value corresponding to the training sample.

The training device may update the parameter of the convolutional neural network by using a back propagation algorithm and the obtained loss value. For example, the parameter of the convolutional neural network is updated by using a stochastic gradient descent algorithm and the loss value corresponding to the training sample.

S407: End the training.

The method 400 may be specifically performed by the training device 120 shown in FIG. 1. The input image (namely, the training sample) in the method 400 may be the training data maintained in the database 130 shown in FIG. 1. Optionally, before S403 is performed, image preprocessing may be performed on the training sample, and the training sample processed in S403 is a training sample obtained after the image preprocessing. An image preprocessing operation on the training sample may be performed by the training device 120; or may be performed in advance by another functional module before the training sample is input into the training device 120, in other words, the image preprocessing is performed on the training sample received or obtained from the database 130, for example, S401 is performed, to obtain the training sample obtained after the image preprocessing, as an input of the training device 120, and the training device 120 performs S401 to S407.

Optionally, the method 400 may be performed by a CPU, may be jointly performed by a CPU and a graphics processing unit (GPU), or may be performed by not using a GPU but using another processor suitable for convolutional neural network calculation. This is not limited in this application.

In this embodiment of this application, a convolutional neural network in which a feature map with a relatively low resolution is used to obtain an accurate image segmentation result can be obtained through training, and the execution device performs image voice segmentation by using the convolutional neural network obtained through training. This can greatly reduce a calculation amount and memory usage of the execution device.

Figure 5:
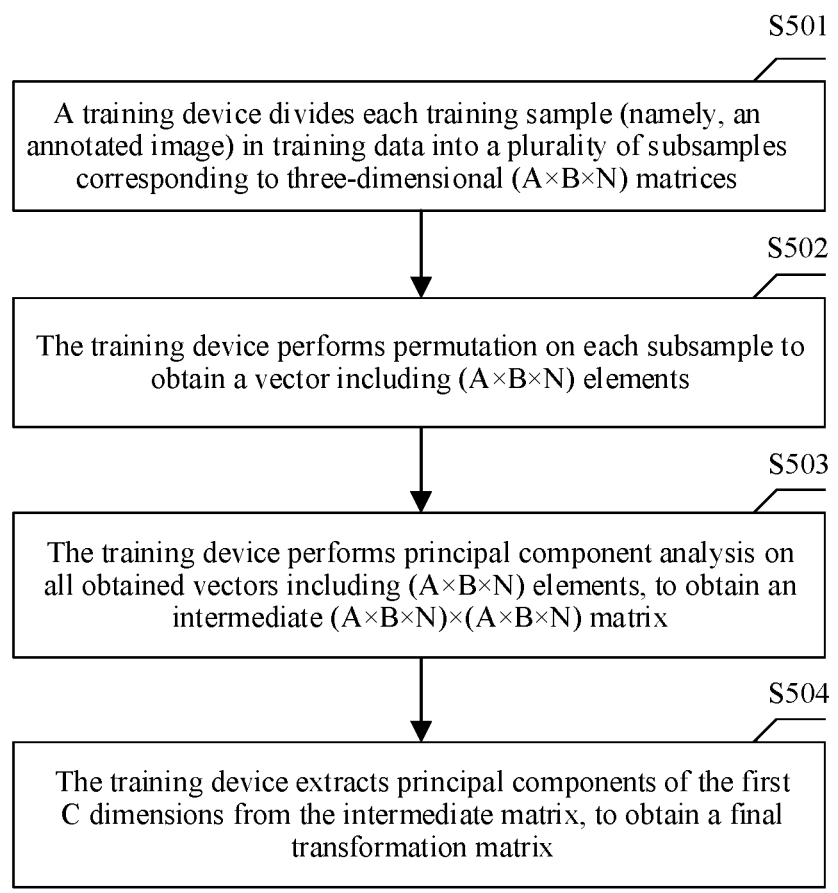
FIG. 5 is a flowchart of a method for generating a transformation matrix based on a training sample according to an embodiment of this application.

In Embodiment 1, the transformation matrix needs to be used in a process in which the training device performs S403. The following describes the method for obtaining the transformation matrix by the training device based on the training sample. FIG. 5 is a flowchart of a method for generating a transformation matrix based on a training sample according to an embodiment of this application. The method may include the following steps.

S501: A training device divides each training sample (namely, an annotated image) in training data into a plurality of subsamples corresponding to three-dimensional (A×B×N) matrices.

Figure 6:
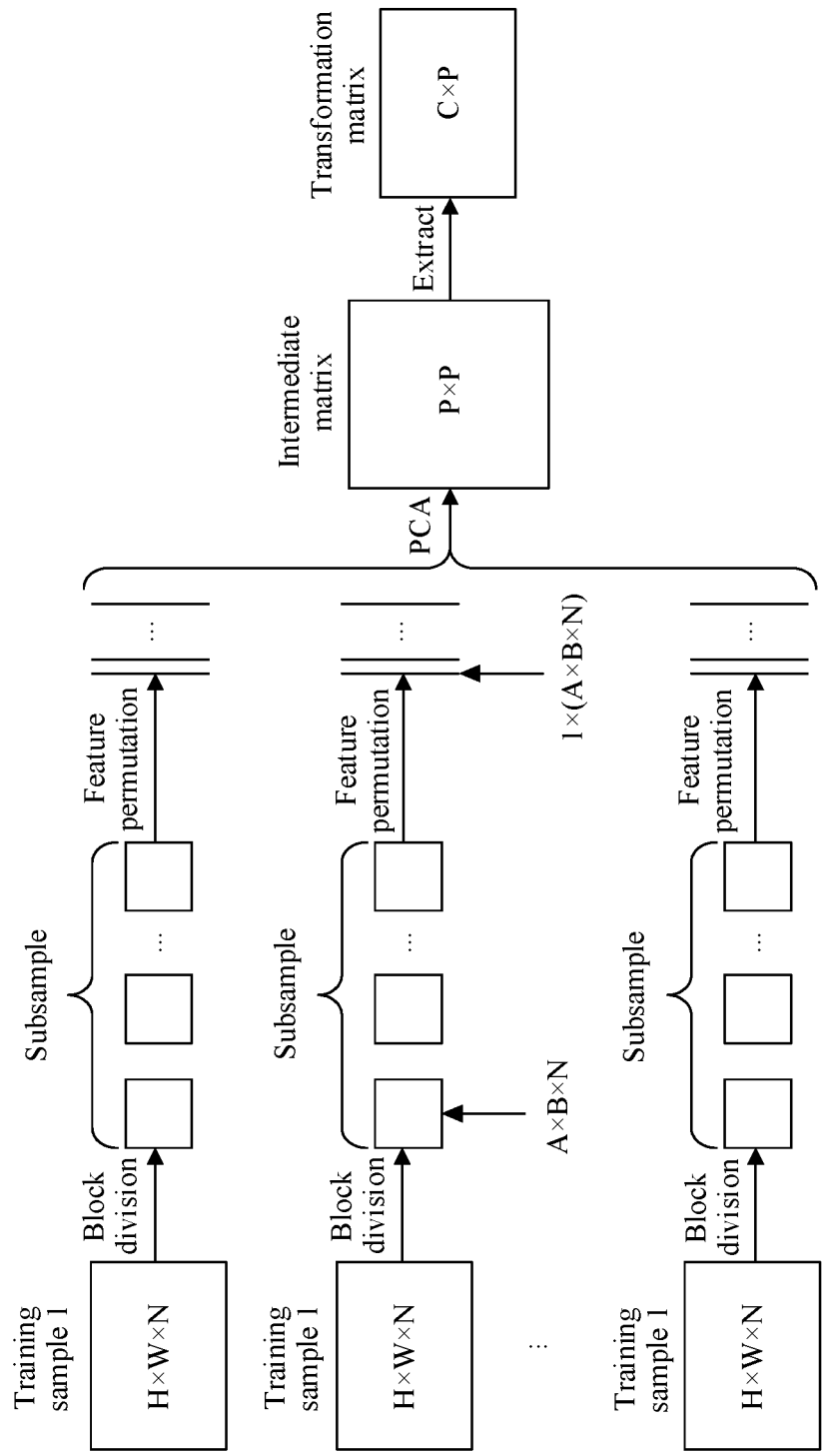
FIG. 6 is a schematic diagram of a transformation matrix calculation process according to an embodiment of this application.

Each subsample may be understood as a small block in the training sample, that is, a part of the training sample. Each training sample in the training data is a three-dimensional (H×W×N) matrix. The training device may divide each training sample into blocks, that is, divide the three-dimensional (H×W×N) matrix corresponding to each training sample into a plurality of (A×B×N) submatrices (subsamples). FIG. 6 is a schematic diagram of a transformation matrix calculation process according to an embodiment of this application. As shown in FIG. 6, one three-dimensional (H×W×N) matrix, namely, one training sample, may be divided into a plurality of subsamples, and each subsample corresponds to one three-dimensional (A×B×N) matrix. A, B, and N are all integers greater than 0. N is a quantity of categories into which image semantics in each training sample are segmented.

S502: The training device performs permutation on each subsample to obtain a vector including (A×B×N) elements.

As shown in FIG. 6, the training device performs permutation on each subsample (a small block in FIG. 6) to obtain a vector including (4×N) elements. The training device may obtain one vector including (A×B×N) elements based on one subsample.

S503: The training device performs principal component analysis on all obtained vectors including (A×B×N) elements, to obtain an intermediate (A×B×N)×(A×B×N) matrix.

The intermediate matrix is a two-dimensional matrix. The principal component analysis (PCA) is a statistical method used to convert a group of variables that may be correlated into a group of linearly unrelated variables through orthogonal transformation. The group of converted variables are referred to as principal components. The training device may implement S503 as follows: (1) The training device combines all the obtained vectors including (A×B×N) elements into a two-dimensional Q×(A×B×N) matrix X'. (2) X' is normalized (an average value is 0, and a standard deviation is 1) to obtain a normalized two-dimensional matrix X. (3) Singular value decomposition is performed on the two-dimensional matrix X to obtain an intermediate (P×P) matrix. Q is a quantity of all the vectors including (A×B×N) elements. The intermediate matrix is an eigenmatrix U obtained by performing the singular value decomposition on X. P=A×B×N. A formula for performing the singular value decomposition on X is as follows:

$$(U, S, VT) = FSVD(X)$$

A column in U and a column in V are respectively referred to as a left-singular vector and a right-singular vector of X, and a value on a diagonal of S is referred to as a singular value of X. The column in U consists of unitized feature vectors obtained through XXT. The column in V consists of unitized feature vectors obtained through $X^TX$. Diagonal elements of S are derived from square roots of the feature vectors obtained through XTX or XXT, and are arranged in descending order. The singular value decomposition (SVD) is a matrix decomposition method. The SVD is a common method, and details are not described herein.

S504: The training device extracts principal components of the first C dimensions from the intermediate matrix, to obtain a final transformation matrix.

The transformation matrix is a two-dimensional (C×(A×B×N)) matrix. For example, both A and B are 2, and the transformation matrix is a two-dimensional (C×4N) matrix. The transformation matrix may be a submatrix corresponding to the first C rows of the intermediate matrix.

In this embodiment of this application, the transformation matrix is generated based on the training sample. In this way, an accurate image segmentation result can be obtained by using a feature map with a relatively low resolution.

Figure 7:
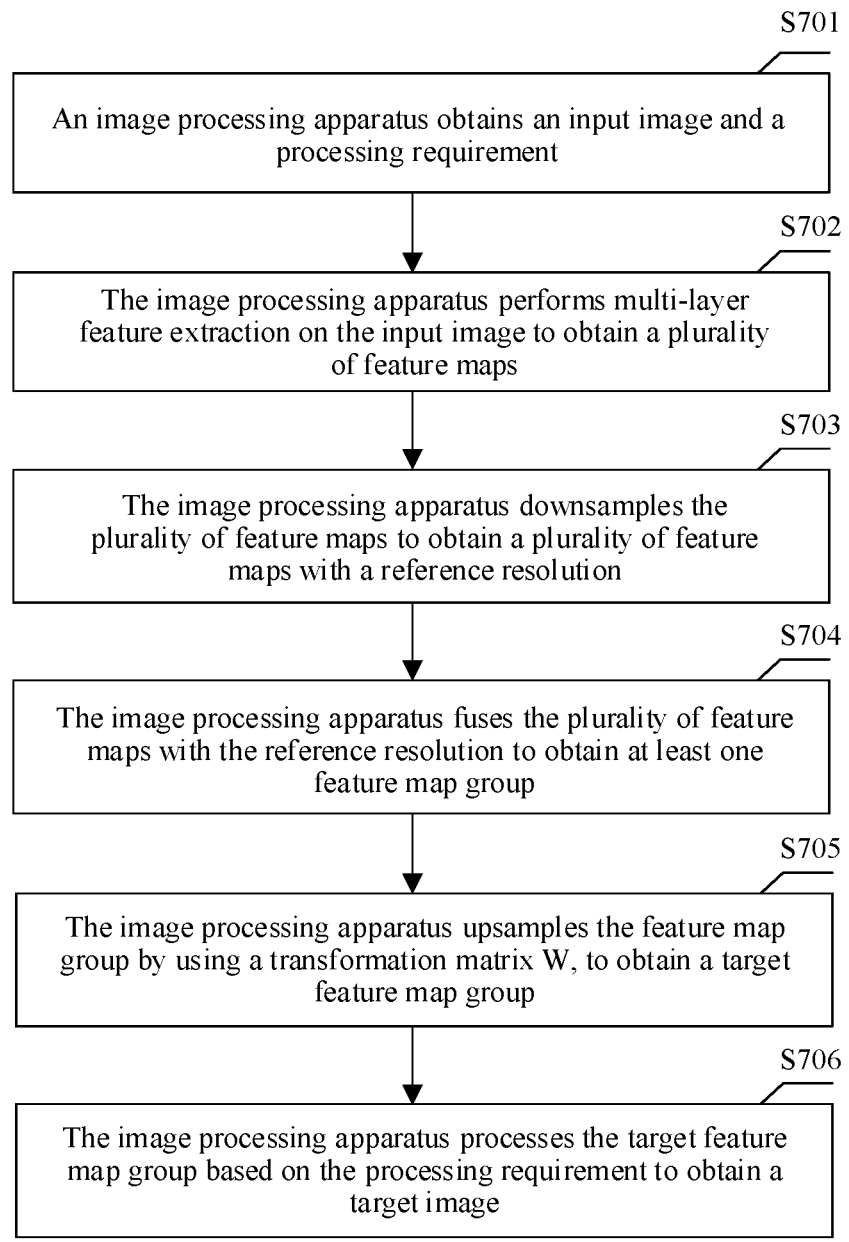
FIG. 7 is a flowchart of an image segmentation method according to an embodiment of this application.

In the foregoing embodiment, the method for obtaining, through training, a convolutional neural network used to implement an image semantic segmentation task is described. The following describes a method for executing the image semantic segmentation task by using the convolutional neural network obtained through training. FIG. 7 shows an image segmentation method provided in an embodiment of this application. The method may include the following steps.

S701: An image processing apparatus obtains an input image and a processing requirement.

A two-dimensional matrix of the input image on a channel is an (H×A)×(W×B) matrix. The image processing apparatus is the execution device mentioned above. H, W, A, and B are all integers greater than 0. The image processing apparatus may obtain the input image by using a camera, may obtain the input image from a customer device or a database, or may obtain the input image in another manner. This is not limited in this application. The processing requirement may be input by a user, or may be preconfigured by the image processing apparatus. The processing requirement is used to indicate to perform target processing on a target feature map group (namely, an image segmentation result) obtained by performing image segmentation on the input image. The processing requirement may be used to indicate to adjust a region, in the input image, other than a region in which a target object is located, for example, to adjust a depth of field or change a background; may be used to indicate to determine a region in which a portrait in the input image is located, and retain only a color of the region in which the portrait is located; or may be used to indicate to perform other processing on the input image. This is not limited in this application. In this application, the target feature map group and the image segmentation result are conceptually the same. The image processing apparatus may determine, based on the target feature map group, regions in which different objects in the input image are located, for example, the region in which the portrait is located.

S702: The image processing apparatus performs multi-layer feature extraction on the input image to obtain a plurality of feature maps.

S703: The image processing apparatus downsamples the plurality of feature maps to obtain a plurality of feature maps with a reference resolution.

The reference resolution is less than a resolution of the input image.

S704: The image processing apparatus fuses the plurality of feature maps with the reference resolution to obtain at least one feature map group.

S705: The image processing apparatus upsamples the feature map group by using a transformation matrix W, to obtain the target feature map group.

The target feature map group has a same resolution as that of the input image. The transformation matrix W is obtained by modeling training data of an image segmentation task, and one dimension of the transformation matrix W is the same as a quantity of channels of the feature group. The target feature map group is the image segmentation result obtained by performing the image segmentation on the input image. The target feature map group is used to indicate the region in which the target object in the input image is located. The target object may be the portrait in the input image, may be a preset detection object (for example, a cat or a dog), or may be an object selected by the user in the input image.

S706: The image processing apparatus performs the target processing on the target feature map group based on the processing requirement to obtain a target image.

The performing the target processing on the target feature map group may be: determining, based on the target feature map group, the regions in which the different objects are located in the input image, and then performing the target processing on a region. For example, after determining, based on the target feature map group, a region in which a photographed object in the input image is located, the image processing apparatus makes a foreground of the photographed object clear and a background blurred, to implement single-lens reflex bokeh. For another example, after using the image processing apparatus to photograph an image, the user may select a portrait whose color needs to be retained (that is, a processing requirement). The image processing apparatus performs image semantic segmentation on the image, determines, based on an obtained image segmentation result, a region in which the portrait is located, and further retains only a color of the region in which the portrait in the image is located. For another example, after the user uses the image processing apparatus to photograph an image, the image processing apparatus performs image semantic segmentation on the photographed image and determines, based on an image segmentation result, a region in which a target object (for example, a portrait) in the image is located. In this way, the user can adjust a region, in the image, other than the region in which the target object is located, for example, adjust a depth of field, or change a background.

The following describes in detail implementations of S702 and S703. The image processing apparatus may perform the steps S702 and S703 as follows: The image processing apparatus processes the input image by using a convolutional neural network, to obtain K feature maps with the reference resolution.

Figure 8:
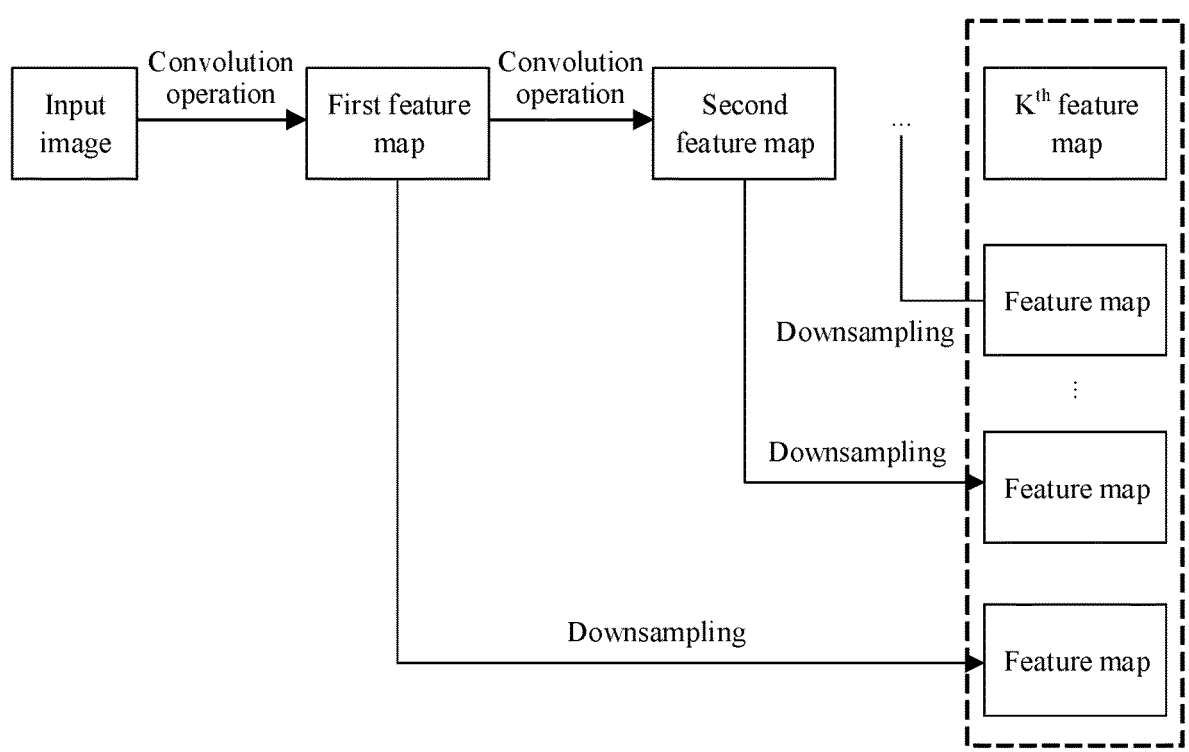
FIG. 8 is a schematic diagram of processing, by using a convolutional neural network, an input image to obtain K feature maps with a reference resolution according to an embodiment of this application.

The K feature maps with the reference resolution correspond to C two-dimensional (H×W) matrices, where both C and K are integers greater than 0. FIG. 8 is a schematic diagram of processing, by using a convolutional neural network, an input image to obtain K feature maps with a reference resolution according to an embodiment of this application. Referring to FIG. 8, an implementation in which the image processing apparatus processes the input image by using the convolutional neural network, to obtain the K feature maps with the reference resolution may be as follows: A convolution operation is performed on the input image to obtain a first feature map, a convolution operation is performed on the first feature map to obtain a second feature map, and the rest is deduced by analogy until a convolution operation is performed on a $(K-1)^{th}$ feature map to obtain a $K^{th}$ feature map; and the first feature map is downsampled to obtain a feature map with the reference resolution, the second feature map is downsampled to obtain a feature map with the reference resolution, and the rest is deduced by analogy until the $(K-1)^{th}$ feature map is downsampled to obtain a feature map with the reference resolution. The $K^{th}$ feature map is a feature map with the reference resolution, a resolution of the $(K-1)^{th}$ feature map is not greater than that of the $K^{th}$ feature map, and K is an integer greater than 1. Feature maps in a dotted box in FIG. 8 are the K feature maps with the reference resolution that are obtained by processing the input image. In this implementation, resolutions of the first feature map to the $K^{th}$ feature map decrease sequentially. The convolutional neural network may include a plurality of convolutional layers (corresponding to convolution modules) and a plurality of downsampling layers (corresponding to a downsampling module). A feature map output from a current convolutional layer is an input of a next convolutional layer. In other words, the image processing apparatus may perform a convolution operation on the input image by using a convolutional layer, to obtain a feature map; perform a convolution operation on the obtained feature map by using a convolutional layer, to obtain a new feature map; and perform such an operation continuously until a specified quantity of convolution operations is reached, to obtain K feature maps with different resolutions. Optionally, the image processing apparatus performs a convolution operation on a same feature map by using different convolution kernels, to obtain different feature maps. In other words, different feature maps in the K feature maps may be obtained based on a same feature map. A manner in which the image processing apparatus obtains the K feature maps based on the input image is not limited in this application.

The following illustrates, by using an example, a process of performing a convolution operation by the image processing apparatus. For example, the image processing apparatus performs convolution on an input image of the $(1-1)^{th}$ convolutional layer (that is, a feature map input into the convolutional layer) and a convolution kernel, adds an offset $b_j^l$, and obtains a feature map $x_j^l$ by using an activation function $f$.

$$x_j^l = f(\Sigma_{i \in M_j} x_i^{l-1} * k_{ij}^l + b_j^l) \quad (1)$$

In the formula (1), $M_j$ represents a series of input images connected to a $j^{th}$ neuron, (*) represents a convolution operation, and $\Sigma(\cdot)$ represents a summation operation. The activation function $f$ may be a sigmoid function, a tanh function, a ReLU function, or an activation function of another type. This is not limited in this application.

The image processing apparatus may downsample, in a downsampling manner such as bilinear interpolation, nearest-neighbor interpolation, median interpolation, or mean interpolation, feature maps output by the convolutional layers (namely, the convolution modules), to reduce a resolution of each feature map. In this way, the resolution of each feature map is consistent with a resolution of a feature map output from the last convolutional layer. The following uses bilinear downsampling as an example to describe a downsampling process. It is assumed that a size of an original image (namely, an input image) is m×n, where m and n are a quantity of rows and a quantity of columns of the original image respectively. If a scaling factor (also referred to as a scaling factor) of the original image is t (0<t<1), that is, the original, image is scaled down by 1/t times, a size of a target image is (m×t)×(n×t). For a pixel P (x, y) of the target image, coordinates (x1, y1) of a corresponding pixel P' of the original image may be obtained by using P/t. x1=x/t, and y1=y/t. If neither x1 nor y1 is an integer, grayscales f1, f2, f3, and f4 of four points adjacent to (x1, y1) may be found, and a grayscale of the pixel P' (x1, y1) can be obtained by using a bilinear interpolation algorithm.

A complete bilinear interpolation algorithm may be described as follows:

(1) A size of a new image is obtained based on an original image and a scaling factor, and the new image (namely, a target image) is created.

(2) A pixel (x, y) of the new image is mapped to (x', y') of the original image.

(3) x' and y' are rounded to obtain (xx, yy), and values of four pixels (xx, yy), (xx+1, yy), (xx, yy+1), and (xx+1, yy+1) are obtained.

(4) A value of the pixel (x, y) is obtained by performing bilinear interpolation by using the obtained values of the four pixels, and is written back to the new image.

(5) The step (2) is repeated until values of all pixels of the new image are determined.

The following describes in detail implementations of S704 and S705. The image processing apparatus may perform the steps S704 and S705 as follows: The image processing apparatus calculates, by using the convolutional neural network, a product of the transformation matrix and each of (H×W) one-dimensional matrices that each include C elements, to obtain (H×W) one-dimensional matrices that each include P elements; and the image processing apparatus separately performs, by using the convolutional neural network, feature permutation on the (H×W) one-dimensional matrices that each include P elements, to obtain the target feature map group.

Figure 9:
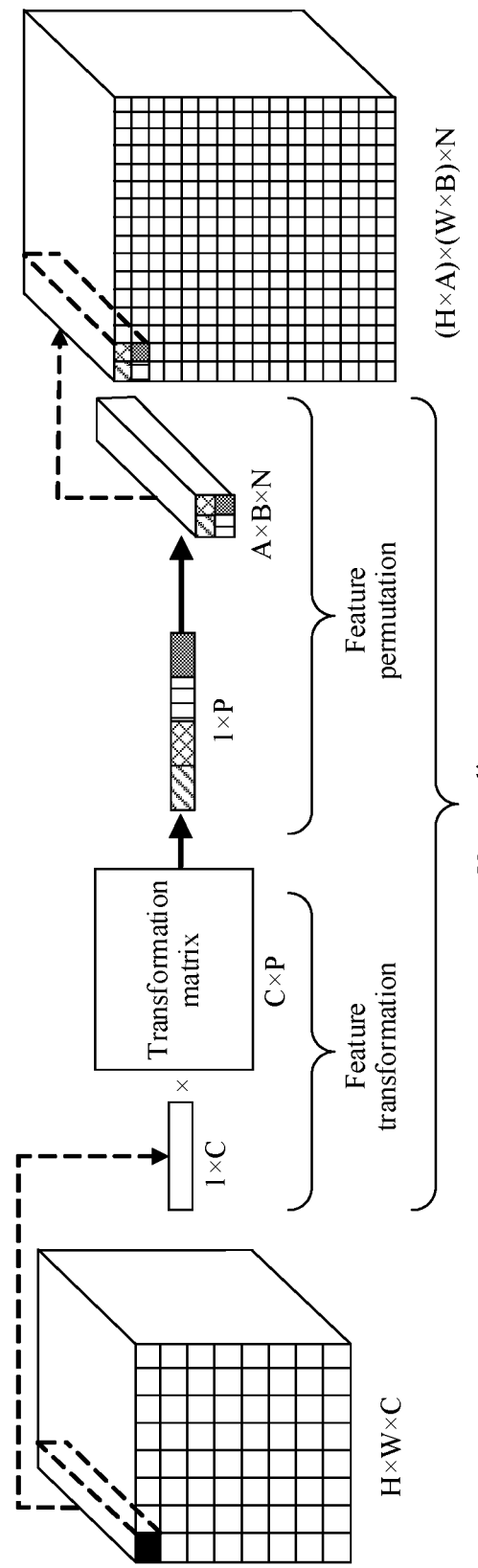
FIG. 9 is a schematic diagram of an upsampling process according to an embodiment of this application.

An element included in any one of the (H×W) one-dimensional matrices that each include C elements is an element at a same location in each of the C two-dimensional (H×W) matrices corresponding to the K feature maps with the reference resolution. The C two-dimensional (H×W) matrices correspond to one three-dimensional (H×W×C) matrix. FIG. 9 is a schematic diagram of an upsampling process according to an embodiment of this application. A three-dimensional (H×W×C) matrix in FIG. 9 is a three-dimensional matrix corresponding to the C two-dimensional (H×W) matrices. As shown in FIG. 9, each element location in the three-dimensional (H×W×C) matrix corresponds to, in a channel dimension, one one-dimensional matrix including C elements. For example, a black column-shaped region in the three-dimensional matrix corresponds to one one-dimensional matrix including C elements. It may be understood that the C two-dimensional (H×W) matrices correspond to the (H×W) one-dimensional matrices that each include C elements, and one one-dimensional matrix including P elements may be obtained by multiplying the transformation matrix by each one-dimensional matrix including C elements. The transformation matrix is a two-dimensional (C×P) matrix obtained based on M annotated images, where P=A×B×N, and N is a quantity of categories into which image semantics in the M annotated images are segmented. A manner of obtaining the transformation matrix is described in the foregoing embodiment, and details are not described herein again. H, W, C, N, P, M, K, A, and B are all integers greater than 0.

A manner in which the image processing apparatus separately performs, by using the convolutional neural network, the feature permutation on the (H×W) one-dimensional matrices that each include P elements, to obtain the image segmentation result is as follows: The image processing apparatus determines, by using the convolutional neural network and based on each one-dimensional matrix including P elements, (A×B) one-dimensional matrices that each include N elements; obtains one three-dimensional (A×B×N) matrix by using (A×B) one-dimensional matrices that each include N elements and that are obtained by using one one-dimensional matrix including P elements; and uses each three-dimensional (A×B×N) matrix as a submatrix included in the image segmentation result. It may be understood that one three-dimensional (A×B×N) matrix may be obtained by performing the feature permutation on each one-dimensional matrix including P elements and is used as a submatrix included in the image segmentation result. A three-dimensional ((H×A)×(W×B)×N) matrix in FIG. 9 is the image segmentation result. As shown in FIG. 9, the image processing apparatus may obtain one three-dimensional (A×B×N) matrix by using each one-dimensional matrix including P elements, and use the three-dimensional (A×B×N) matrix as a part of the image segmentation result. In actual application, the image processing apparatus may sequentially process each one-dimensional matrix including P elements to obtain one three-dimensional (A×B×N) matrix, and use the three-dimensional (A×B×N) matrix as a submatrix included in the image segmentation result, to finally obtain the image segmentation result.

In this embodiment of this application, the image processing apparatus performs, by using the convolutional neural network, the convolution operation and downsampling on the input image to obtain a plurality of feature maps with relatively low resolutions, and performs feature permutation on the feature maps with relatively low resolutions to obtain the image segmentation result. This can effectively reduce memory usage and a calculation amount, and ensures relatively high image semantic segmentation precision.

In an optional implementation, the image processing apparatus may perform the step S704 as follows: The image processing apparatus stitches the K feature maps with the reference resolution in the channel dimension, to obtain a fused feature map, namely, the three-dimensional (H×W×C) matrix in FIG. 9.

Figure 10:
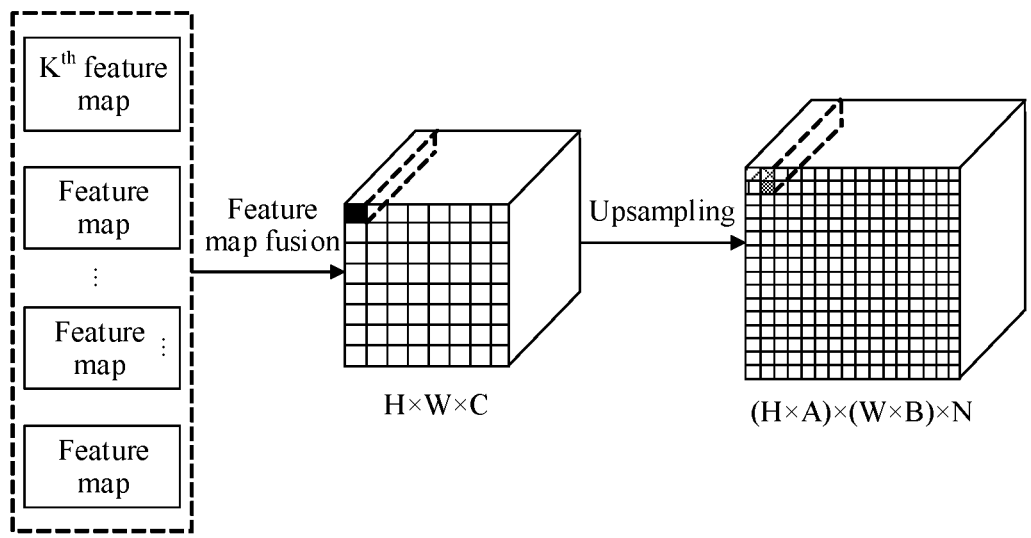
FIG. 10 is a schematic diagram of a feature map fusion process and an upsampling process according to an embodiment of this application.

The image processing apparatus calculates a product of the transformation matrix and a one-dimensional matrix corresponding to each element location in the fused feature map, to obtain the (H×W) one-dimensional matrices that each include P elements. An element included in a one-dimensional matrix corresponding to one element location in the fused feature map is an element at a same element location in each of the C two-dimensional (H×W) matrices. The fused feature map is a three-dimensional (H×W×C) matrix and corresponds to the C two-dimensional (H×W) matrices. In this application, the fused feature map is the at least one feature map group obtained by fusing the plurality of feature maps with the reference resolution in the step S704. FIG. 10 is a schematic diagram of a feature map fusion process and an upsampling process according to an embodiment of this application. As shown in FIG. 10, feature maps in a rectangular box formed by dotted lines are the K feature maps with the reference resolution of the image processing apparatus. A three-dimensional (H×W×C) matrix is the fused feature map obtained by fusing the K feature maps with the reference resolution. A three-dimensional ((H×A)×(W×B)×N) matrix is the image segmentation result obtained by upsampling the fused feature map. The upsampling in FIG. 10 is the upsampling in FIG. 9. A hidden layer (corresponding to a feature map fusion module) of the convolutional neural network is configured to fuse the K feature maps with the reference resolution to obtain the fused feature map. A hidden layer (corresponding to an upsampling module) of the convolutional neural network is configured to upsample the fused feature map to obtain the image segmentation result.

Figure 11:
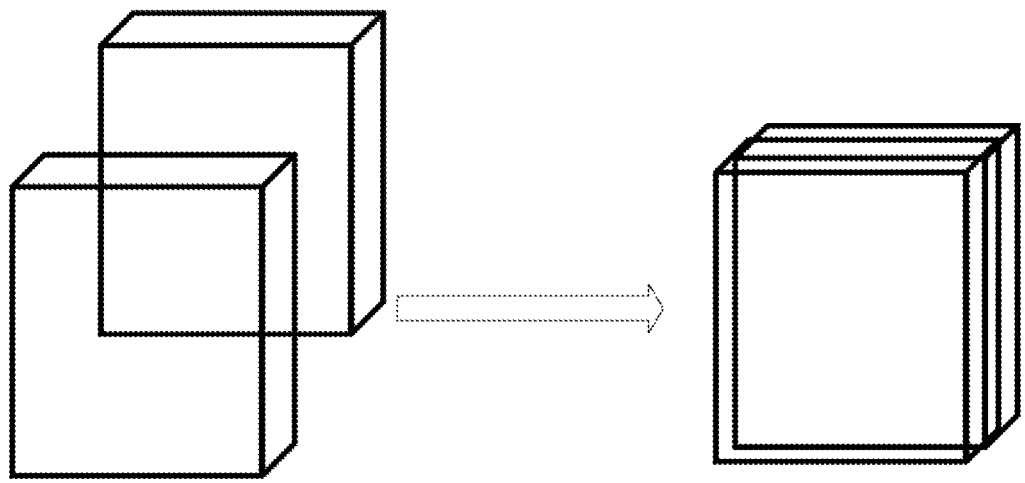
FIG. 11 is a schematic diagram of a feature map fusion process according to an embodiment of this application.

The image processing apparatus may stitch the K reference resolutions based on the channel dimension. Any feature map is described from the following dimensions: n*Channel*H*W. H and W respectively represent a length and a width of the feature map, n indicates a quantity of images input into the entire convolutional neural network, and Channel indicates a quantity of channels. The image processing apparatus may stitch two or more feature maps based on the dimension Channel (namely, the channel dimension) or the dimension n. The feature map fusion module is configured to stitch two or more feature maps based on the dimension Channel (namely, the channel dimension) or the dimension n. For example, if a feature map 1 and a feature map 2 are stitched in the dimension Channel, channel dimensions of the feature map 1 and the feature map 2 may be different and other dimensions need to be consistent (that is, n, H, and W are consistent). As shown in FIG. 11 (for ease of drawing and description, n is set to 1), the image processing apparatus only adds a channel 1 in the feature map 1 and a channel 2 in the feature map 2. Dimensions of an obtained fused feature map are n*(Channel 1+Channel 2)*H*W.

Figure 12:
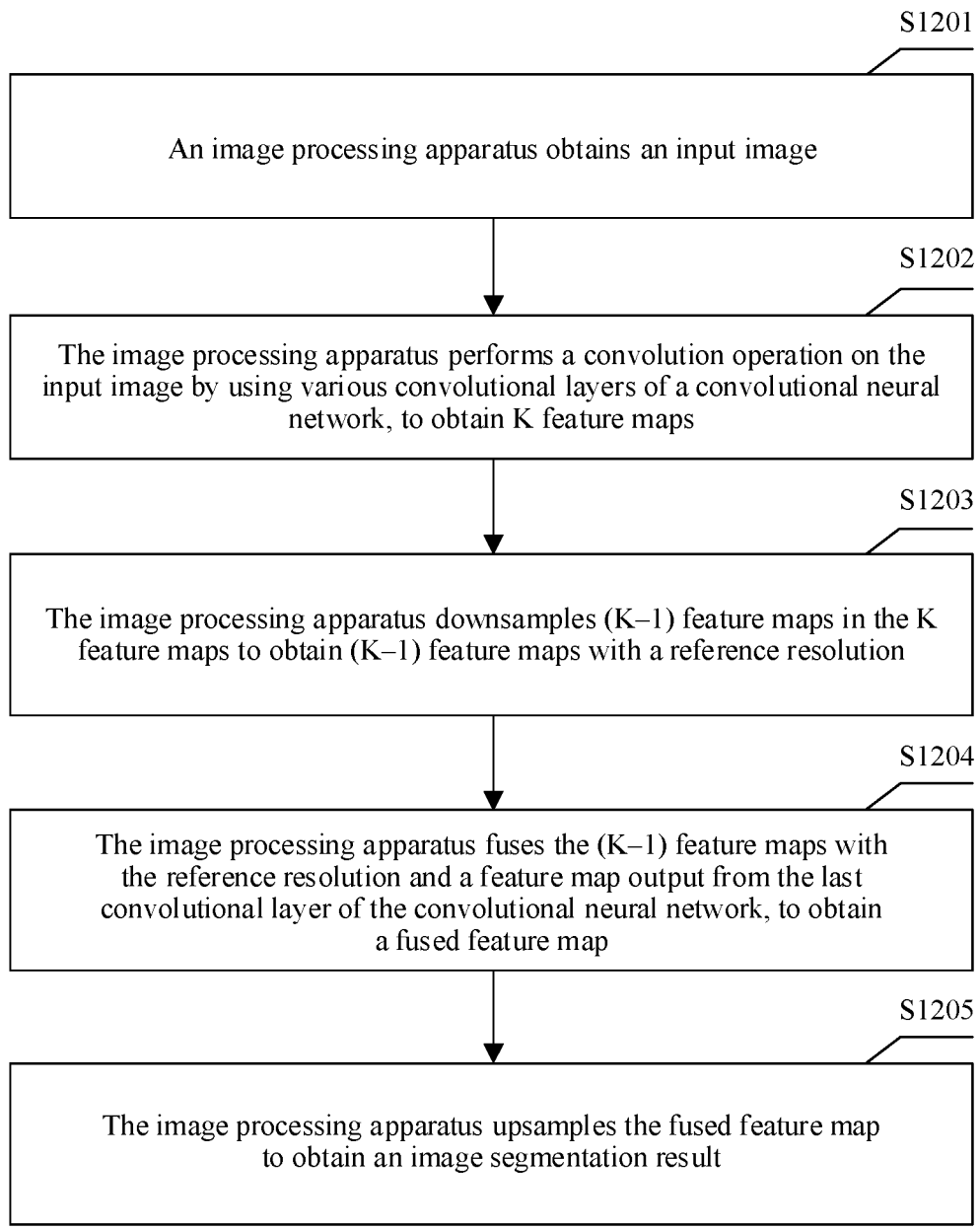
FIG. 12 is a flowchart of another image segmentation method according to an embodiment of this application.

The following describes, with reference to FIG. 8 to FIG. 10, an image segmentation method provided in this application. FIG. 12 shows another image segmentation method provided in an embodiment of this application. The method may include the following steps.

S1201: An image processing apparatus obtains an input image.

S1202: The image processing apparatus performs a convolution operation on the input image by using various convolutional layers of a convolutional neural network, to obtain K feature maps.

The plurality of feature maps correspond to the first feature map to the $K^{th}$ feature map mentioned above. The image processing apparatus may perform a convolution operation on the input image by using the first convolutional layer, to obtain a feature map; perform a convolution operation on the obtained feature map by using the second convolutional layer, to obtain a new feature map; and perform such an operation continuously until a specified quantity of convolution operations is reached, to obtain the K feature maps with different resolutions. In other words, a feature map output from a current convolutional layer is an input of a next convolutional layer, and feature maps output from the convolutional layers of the convolutional neural network form the K feature maps. For a convolution operation performed by using each convolutional layer, refer to the formula (1).

S1203: The image processing apparatus downsamples (K−1) feature maps in the K feature maps to obtain (K−1) feature maps with a reference resolution.

The (K−1) feature maps are feature maps, in the K feature maps, other than a feature map output from the last convolutional layer of the convolutional neural network. For a downsampling process, refer to FIG. 8.

S1204: The image processing apparatus fuses the (K−1) feature maps with the reference resolution and the feature map output from the last convolutional layer of the convolutional neural network, to obtain a fused feature map.

S1204 corresponds to the fusion operation in FIG. 10 and FIG. 11.

S1205: The image processing apparatus upsamples the fused feature map to obtain an image segmentation result.

S1205 corresponds to the upsampling operation in FIG. 10. The downsampling operation in S1203, the fusion operation in S1204, and the upsampling operation in S1205 can be implemented at a hidden layer of the convolutional neural network.

In actual application, after obtaining the image segmentation result of the input image, the image processing apparatus may perform further processing based on the image segmentation result. The image processing apparatus may be a mobile terminal, for example, a mobile phone. For example, a user performs real-time image semantic segmentation on a collected image by using a camera function of a mobile terminal, to obtain an image segmentation result. After determining, based on the image segmentation result, a region in which a photographed object in the image is located, the mobile terminal makes a foreground of the photographed clear and a background blurred, to implement single-lens reflex bokeh. For another example, after using a mobile terminal to photograph an image, a user may select a portrait whose color needs to be retained. The mobile terminal performs image semantic segmentation on the image, determines, based on an obtained image segmentation result, a region in which the portrait is located, and further retains only a color of the region in which the portrait in the image is located. For another example, after a user uses a mobile terminal to photograph an image, the mobile terminal performs image semantic segmentation on the photographed image and determines, based on an image segmentation result, a region in which a target object (for example, a portrait) in the image is located. In this way, the user can adjust a region, in the image, other than the region in which the target object is located, for example, adjust a depth of field, or change a background. For another example, a user enables a video shooting function of a mobile terminal. In a video shooting process, the mobile terminal performs image semantic segmentation in real time, determines a portrait region based on an image segmentation result, and then retains only a color of the portrait region. In this way, a color of a portrait in a video is retained. For another example, a user enables a video shooting function of a mobile terminal. The mobile terminal performs image semantic segmentation in real time. When there are a plurality of photographed persons, the mobile terminal performs segmentation based on an image segmentation result to obtain all portraits. The user may randomly select a clear target portrait that needs to be retained, and the mobile terminal blurs each part, in the image, other than a region in which the target portrait is located, to implement a movie mode. For another example, an autonomous driving apparatus (for example, an automobile) performs image semantic segmentation on a collected image in real time, performs segmentation based on an image segmentation result to obtain each object in the image, and then performs object detection on each obtained object, to more accurately identify a traveler, an obstacle, a vehicle, and the like. It may be understood that the image processing apparatus may accurately determine, based on the image segmentation result, a region in which each object in the input image is located, to perform different processing on different objects or different regions in the image.

Figure 13:
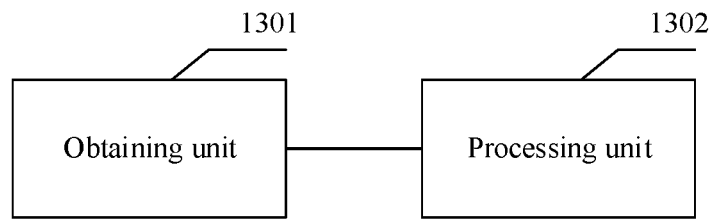
FIG. 13 is a schematic structural diagram of an image processing apparatus according to an embodiment of this application.

The foregoing embodiment describes the image segmentation method. The following describes a structure of an image processing apparatus, and further describes, based on the structure of the image processing apparatus, an operation performed by the image processing apparatus to implement an image semantic segmentation task. The image processing apparatus is an execution device. FIG. 13 is a schematic structural diagram of an image processing apparatus according to this application. As shown in FIG. 13, the image processing apparatus 1300 may include:

an obtaining unit 1301, configured to obtain an input image and a processing requirement, where a two-dimensional matrix of the input image on a channel is an (H×A)× (W×B) matrix, and the processing requirement is used to indicate to perform target processing on a target feature map group (namely, an image segmentation result) obtained by performing image segmentation on the input image; and a processing unit 1302, configured to: perform multi-layer feature extraction on the input image to obtain a plurality of feature maps; downsample the plurality of feature maps to obtain a plurality of feature maps with a reference resolution, where the reference resolution is less than a resolution of the input image; fuse the plurality of feature maps with the reference resolution to obtain at least one feature map group; upsample the feature map group by using a transformation matrix W, to obtain the target feature map group, where the target feature map group has a same resolution as that of the input image, the transformation matrix W is obtained by modeling training data of an image segmentation task, and one dimension of the transformation matrix W is the same as a quantity of channels of the feature group; and perform the target processing on the target feature map group based on the processing requirement to obtain a target image.

A function of the obtaining unit 1301 may be implemented by a camera or an I/O interface in the image processing apparatus. A function of the processing unit 1302 may be implemented by a CPU in the image processing apparatus, or may be implemented by a CPU in cooperation with another processor (for example, an NPU, a TPU, or a GPU).

Figure 14:
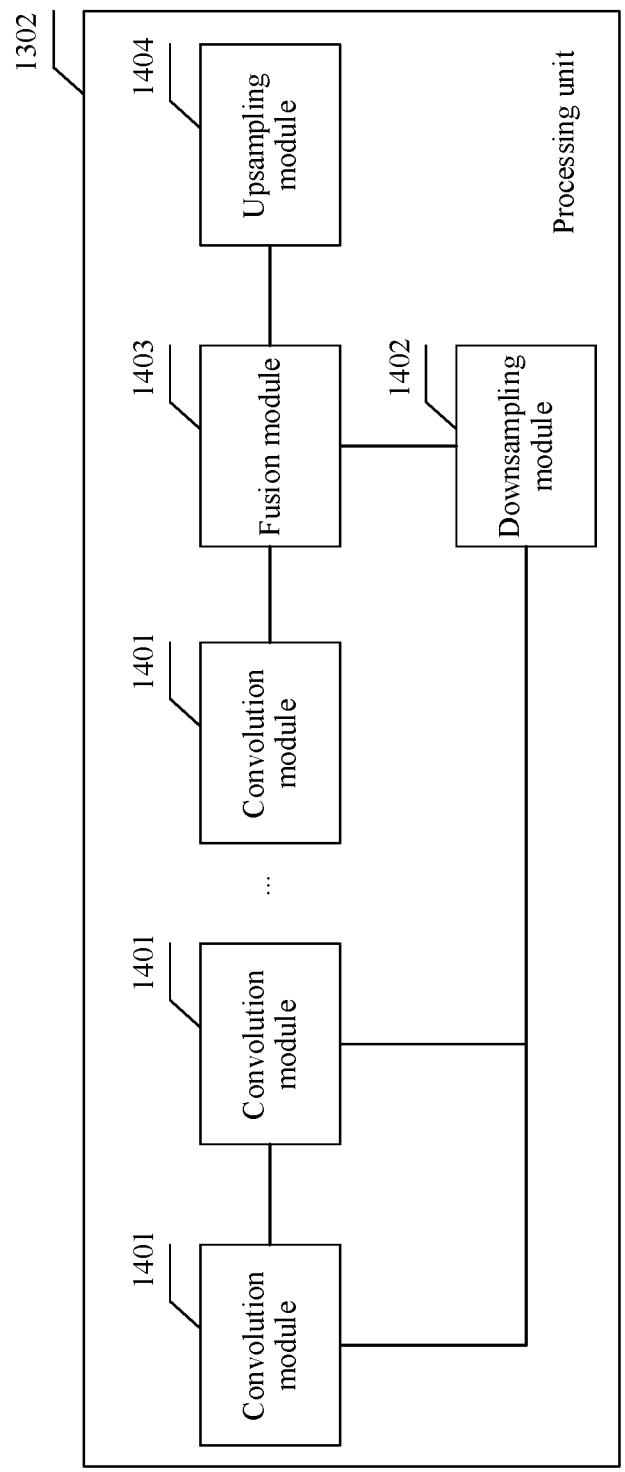
FIG. 14 is a schematic structural diagram of a processing unit according to an embodiment of this application.

In an optional implementation, as shown in FIG. 14, the processing unit 1302 may include:

a convolution module 1401, configured to: perform a convolution operation on the input image and/or a feature map to obtain a feature map, and output the obtained feature map to a next convolutional layer;

a downsampling module 1402, configured to downsample a feature map output by each convolution module, to obtain a feature map with the reference resolution;

a feature map fusion module 1403, configured to fuse each feature map with the reference resolution to obtain a fused feature map; and an upsampling module 1404, configured to perform feature permutation on the fused feature map to obtain the image segmentation result.

The convolution module 1401 is configured to perform a convolution operation on each convolutional layer in a convolutional neural network. For details, refer to the convolution operation in FIG. 8. Optionally, the image processing apparatus includes one convolution module, and the convolution module performs the convolution operation on each convolutional layer. Optionally, the image processing apparatus includes K convolution modules, and each convolution module is configured to perform a convolution operation on one convolutional layer. The downsampling module 1402 is configured to perform the downsampling in FIG. 8, that is, downsample feature maps other than a feature map output from the last convolutional layer, to obtain feature maps with the reference resolution. The feature map fusion module 1403 is configured to implement the feature map fusion operation in FIG. 10 and FIG. 11. The upsampling module 1404 is configured to perform the upsampling operation in FIG. 10. The convolution module 1401, the downsampling module 1402, the feature map fusion module 1403, and the upsampling module 1404 may all be implemented by using software, or may all be implemented by using hardware; or some of the convolution module 1401, the downsampling module 1402, the feature map fusion module 1403, and the upsampling module 1404 may be implemented by using software, and the others may be implemented by using hardware. When software is used to implement the embodiments, the embodiments may be implemented in a form of a computer program product. The computer program product includes one or more computer instructions. When the computer program instructions are loaded or executed on the image processing apparatus, the procedures or functions according to the embodiments of the present application are all or partially generated. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD). Optionally, the image processing apparatus runs software code stored in a memory of the image processing apparatus, to implement functions of the convolution module 1401, the downsampling module 1402, the feature map fusion module 1403, and the upsampling module 1404, in other words, implement functions of the processing unit 1302. Optionally, the image processing apparatus runs hardware code that is of the processor and that is solidified in the image processing apparatus, to implement the foregoing image segmentation method.

Currently, an architecture in which an image is first encoded and then decoded is a common image processing method in a computer vision task, and this framework is used in many computer vision technologies. In this embodiment of this application, the image processing apparatus also uses the architecture in which an image is first encoded and then decoded, that is, uses a convolutional neural network in which an encoder-decoder architecture is used, to process an image semantic segmentation task. The convolutional neural network may be divided into two parts: an encoder and a decoder. The encoder includes the convolution module 1401 and the downsampling module 1402 in FIG. 14, and the decoder includes the feature map fusion module 1403 and the upsampling module 1404 in FIG. 14. The solution provided in this application has at least two advantages compared with a prior-art solution:

1. Information fusion is performed on higher-layer feature maps, original structure information is retained, and segmentation precision is improved.

In the prior-art solution, to implement high-resolution prediction, a decoder module can select only lower-layer high-resolution feature maps for feature map fusion. In other words, a higher-layer low-resolution feature map is fused with the lower-layer high-resolution feature map after being upsampled. In this solution, a lower-layer high-resolution feature map is directly fused with a higher-layer low-resolution feature map after being downsampled, as shown in FIG. 9 and FIG. 10. In addition, in a subsequent upsampling process, a data-related upsampling module is used. In this way, original structure information of an input image is retained, and the segmentation precision is improved.

2. A calculation amount and memory usage are reduced.

In the prior-art solution, the decoder module selects the lower-layer high-resolution feature maps for feature map fusion. A calculation amount of the convolutional neural network depends on a resolution of a feature map. Therefore, the calculation amount of the convolutional neural network is significantly increased when lower-layer feature maps are used for feature map fusion. Therefore, in the prior-art solution, the calculation amount is relatively large, and real-time running cannot be performed on a mobile phone end. In this solution, lower-resolution feature maps are selected for feature map fusion. This improves the segmentation precision, and greatly reduces the calculation amount and the memory usage.

Figure 15:
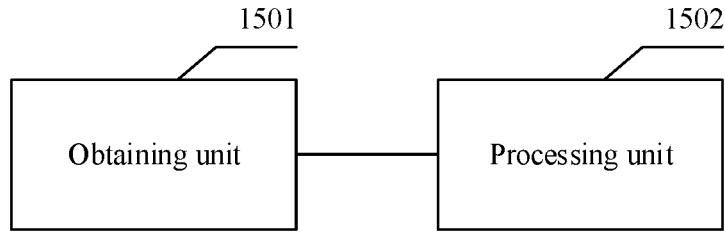
FIG. 15 is a schematic structural diagram of an apparatus for training a convolutional neural network according to an embodiment of this application.

FIG. 15 is a schematic structural diagram of an apparatus for training a convolutional neural network according to this application. As shown in FIG. 15, the image processing apparatus 1500 may include:

an obtaining unit 1501, configured to obtain the transformation matrix; and a processing unit 1502, configured to: process a training sample by using a convolutional neural network, to obtain an image segmentation result of the training sample; determine, based on the image segmentation result of the training sample and a standard result corresponding to the training sample, a loss corresponding to the training sample; and update a parameter of the convolutional neural network by using an optimization algorithm and the loss corresponding to the training sample.

The training sample includes at least one of the foregoing N annotated images. The standard result is a result expected to be obtained by processing the training sample by using the convolutional neural network.

In this embodiment of this application, the training apparatus trains the convolutional neural network by using the training sample. In this way, a convolutional neural network that can be used to process an image semantic segmentation task can be quickly obtained through training.

Figure 16:
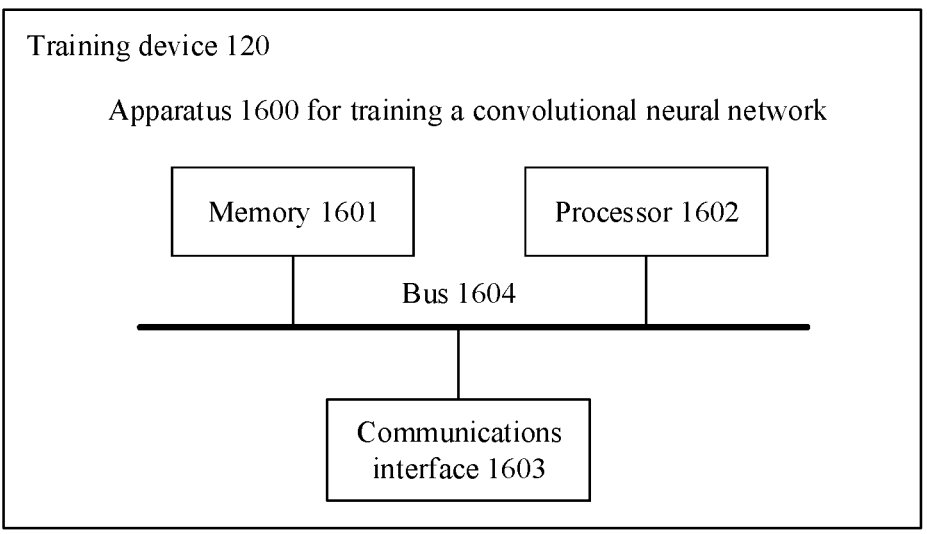
FIG. 16 is a schematic diagram of a hardware structure of an apparatus for training a convolutional neural network according to an embodiment of this application.

FIG. 16 is a schematic diagram of a hardware structure of an apparatus for training a convolutional neural network according to an embodiment of this application. The apparatus 1600 for training a convolutional neural network in FIG. 16 (the apparatus 1600 may specifically be a computer device) includes a memory 1601, a processor 1602, a communications interface 1603, and a bus 1604. Communication connections between the memory 1601, the processor 1602, and the communications interface 1603 are implemented by using the bus 1604.

The memory 1601 may be a read-only memory (ROM), a static storage device, a dynamic storage device, or a random access memory (RAM). The memory 1601 may store a program. When the program stored in the memory 1601 is executed by the processor 1602, the processor 1602 and the communications interface 1603 are configured to perform the steps of the method for training a convolutional neural network in the embodiments of this application.

The processor 1602 may be a general-purpose central processing unit (CPU), a microprocessor, an application-specific integrated circuit (ASIC), a GPU, or one or more integrated circuits, and is configured to execute a related program, to implement functions that need to be performed by the units in the apparatus for training a convolutional neural network in this embodiment of this application, or perform the method for training a convolutional neural network in the method embodiments of this application.

The processor 1602 may alternatively be an integrated circuit chip and has a signal processing capability. In an implementation process, the steps of the method for training a convolutional neural network in this application may be completed by using a hardware integrated logic circuit in the processor 1602 or an instruction in a form of software. The processor 1602 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1602 may implement or perform the methods, steps, and logical block diagrams that are disclosed in the embodiments of this application. The general-purpose processor may be a microprocessor, or the processor may be any conventional processor or the like.

Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1601. The processor 1602 reads information from the memory 1601, and completes, in combination with hardware of the processor 1602, functions that need to be performed by the units included in the apparatus for training a convolutional neural network in this embodiment of this application, or performs the method for training a convolutional neural network in the method embodiments of this application.

The communications interface 1603 uses a transceiver apparatus, for example, but not limited to, a transceiver, to implement communication between the apparatus 1600 and another device or a communications network. For example, training data (for example, the training sample in Embodiment 1 of this application) may be obtained by using the communications interface 1603.

The bus 1604 may include a path for information transfer between various components (for example, the memory 1601, the processor 1602, and the communications interface 1603) of the apparatus 1600.

It should be understood that the obtaining unit 1501 in the apparatus 1500 for training a convolutional neural network is equivalent to the communications interface 1603 in the apparatus 1600 for training a convolutional neural network, and the processing unit 1502 may be equivalent to the processor 1602.

Figure 17:
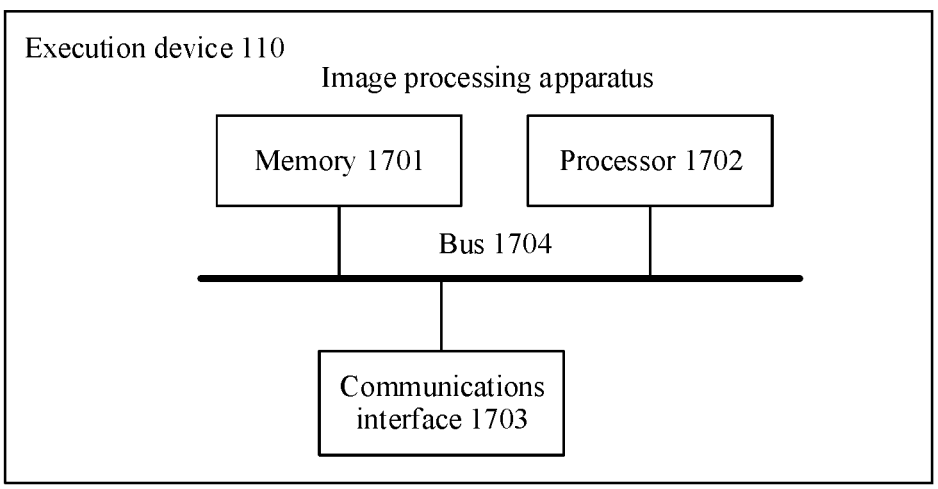
FIG. 17 is a schematic diagram of a hardware structure of an image processing apparatus according to an embodiment of this application.

FIG. 17 is a schematic diagram of a hardware structure of an image processing apparatus according to an embodiment of this application. The image processing apparatus 1700 shown in FIG. 17 (the apparatus 1700 may specifically be a computer device) includes a memory 1701, a processor 1702, a communications interface 1703, and a bus 1704. Communication connections between the memory 1701, the processor 1702, and the communications interface 1703 are implemented by using the bus 1704.

The memory 1701 may be a read-only memory, a static storage device, a dynamic storage device, or a random access memory. The memory 1701 may store a program. When the program stored in the memory 1701 is executed by the processor 1702, the processor 1702 and the communications interface 1703 are configured to perform the steps of the image segmentation method in the embodiments of this application.

The processor 1702 may be a general-purpose central processing unit, a microprocessor, an application-specific integrated circuit, a graphics processing unit (GPU), or one or more integrated circuits, and is configured to execute a related program, to implement functions that need to be performed by the units in the image processing apparatus 1300 in this embodiment of this application, or perform the image segmentation method in the method embodiments of this application.

The processor 1702 may alternatively be an integrated circuit chip and has a signal processing capability. In an implementation process, the steps of the image segmentation method in this application may be completed by using a hardware integrated logic circuit in the processor 1702 or an instruction in a form of software. The processor 1702 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1702 may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1701. The processor 1702 reads information in the memory 1701, and completes, in combination with hardware of the processor 1702, functions that need to be performed by the units included in the image processing apparatus in this embodiment of this application, or performs the image segmentation method in the method embodiments of this application.

The communications interface 1703 uses a transceiver apparatus, for example, but not limited to, a transceiver, to implement communication between the apparatus 1700 and another device or a communications network. For example, training data (for example, the input image in Embodiment 2 of this application) may be obtained by using the communications interface 1703.

The bus 1704 may include a path for information transfer between various components (for example, the memory 1701, the processor 1702, and the communications interface 1703) of the apparatus 1700.

It should be understood that the obtaining unit 1301 in the image processing apparatus 1300 is equivalent to the communications interface 1703 in the image processing apparatus 1700, and the processing unit 1301 in the image processing apparatus 1300 may be equivalent to the processor 1702.

It should be noted that although only the memory, the processor, and the communications interface of each of the apparatuses 1600 and 1700 shown in FIG. 16 and FIG. 17 are illustrated, in a specific implementation process, a person skilled in the art should understand that the apparatuses 1600 and 1700 each further include other components necessary for normal running. In addition, based on a specific requirement, a person skilled in the art should understand that the apparatuses 1600 and 1700 each may further include hardware components for implementing other additional functions. In addition, a person skilled in the art should understand that the apparatuses 1600 and 1700 each may include only components necessary for implementing the embodiments of this application, but not necessarily include all the components shown in FIG. 16 or FIG. 17.

It may be understood that the apparatus 1600 is equivalent to the training device 120 in FIG. 1, and the apparatus 1700 is equivalent to the execution device 110 in FIG. 1. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. An image segmentation method, comprising:
obtaining an input image and a processing requirement, wherein the processing requirement is used to indicate to perform target processing on a target feature map group obtained by performing image segmentation on the input image;
performing multi-layer feature extraction on the input image to obtain a plurality of feature maps;
downsampling the plurality of feature maps to obtain a plurality of feature maps with a reference resolution, wherein the reference resolution is less than a resolution of the input image;
fusing the plurality of feature maps with the reference resolution to obtain at least one feature map group;
upsampling the at least one feature map group by using a transformation matrix W, to obtain the target feature map group, wherein the target feature map group has a same resolution as that of the input image, the transformation matrix W is obtained by modeling training data of an image segmentation task, and one dimension of the transformation matrix W is the same as a quantity of channels of the feature group; and
performing the target processing on the target feature map group based on the processing requirement to obtain a target image.

2. The method according to claim 1, wherein the upsampling the at least one feature map group by using the transformation matrix W, to obtain the target feature map group comprises:
calculating a product of the transformation matrix W and each of (H×W) one-dimensional matrices that each comprise C elements, to obtain (H×W) one-dimensional matrices that each comprise P elements, wherein an element comprised in any one of the (H×W) one-dimensional matrices that each comprise C elements is an element at a same location in each of C two-dimensional (H×W) matrices comprised in the feature map group, H and W are two dimensions of the feature map group, C is the quantity of channels of the feature map group, the transformation matrix is a two-dimensional (C×P) matrix obtained based on M annotated images comprised in the training data, P=A×B×N, and N is a quantity of categories into which image semantics in the M annotated images are segmented; and
separately performing feature permutation on the (H×W) one-dimensional matrices that each comprise P elements, to obtain the target feature map group, wherein at least one (A×B×N) submatrix comprised in the target feature map group is obtained based on one of the (H×W) one-dimensional matrices that each comprise P elements, and H, W, C, N, P, M, A, and B are all integers greater than 0.

3. The method according to claim 2, wherein the separately performing feature permutation on the (H×W) one-dimensional matrices that each comprise P elements, to obtain the target feature map group comprises:
determining, based on any one of the (H×W) one-dimensional matrices that each comprise P elements, (A×B) one-dimensional matrices that each comprise N elements; and
using, as a submatrix comprised in the target feature map group, a three-dimensional (A×B×N) matrix obtained based on the (A×B) one-dimensional matrices that each comprise N elements.

4. The method according to claim 2, wherein any one of the M annotated images is a three-dimensional (H×W×N) matrix, and the transformation matrix W is obtained by performing the following operations:

obtaining at least one (A×B×N) submatrix corresponding to each of the M annotated images to obtain a plurality of (A×B×N) submatrices;

obtaining, based on the plurality of (A×B×N) submatrices, a plurality of vectors comprising P elements, wherein a vector comprising P elements is obtained based on each of the plurality of (A×B×N) submatrices;

performing principal component analysis on the plurality of vectors comprising P elements to obtain a two-dimensional (P×P) matrix; and using one (C×P) submatrix comprised in the two-dimensional (P×P) matrix as the transformation matrix W.

5. The method according to claim 1, wherein the performing multi-layer feature extraction on the input image to obtain the plurality of feature maps comprises:

performing a convolution operation on the input image to obtain a first feature map, and performing a convolution operation on a $(K-1)^{th}$ feature map to obtain a $K^{th}$ feature map, wherein the $K^{th}$ feature map is a feature map with the reference resolution, a resolution of the $(K-1)^{th}$ feature map is not greater than that of the $K^{th}$ feature map, K is an integer greater than 1, and the plurality of feature maps comprise K feature maps; and wherein the downsampling the plurality of feature maps to obtain the plurality of feature maps with the reference resolution comprises:

downsampling the first feature map to obtain a feature map with the reference resolution, and downsampling the $(K-1)^{th}$ feature map to obtain a feature map with the reference resolution.

6. The method according to claim 2, wherein the fusing the plurality of feature maps with the reference resolution to obtain the at least one feature map group comprises:

stitching the plurality of feature maps with the reference resolution in a channel dimension to obtain the at least one feature map group, wherein the at least one feature map group is a three-dimensional (H×W×C) matrix and corresponds to the C two-dimensional (H×W) matrices; and wherein the calculating the product of the transformation matrix W and each of the (H×W) one-dimensional matrices that each comprise the C elements to obtain the (H×W) one-dimensional matrices that each comprise the P elements comprises:

calculating a product of the transformation matrix and a one-dimensional matrix corresponding to each element location in the feature map group, to obtain the (H×W) one-dimensional matrices that each comprise P elements, wherein an element comprised in a one-dimensional matrix corresponding to one element location in the feature map group is an element at a same element location in each of the C two-dimensional (H×W) matrices.

7. The method according to claim 1, further comprising:
obtaining the transformation matrix W;
processing a training sample by using a convolutional neural network, to obtain an image segmentation result of the training sample, wherein the training sample is comprised in the training data;
determining, based on the image segmentation result of the training sample and a standard result corresponding to the training sample, a loss corresponding to the training sample, wherein the standard result is a result expected to be obtained by processing the training sample by using the convolutional neural network; and updating a parameter of the convolutional neural network by using an optimization algorithm and the loss corresponding to the training sample;

wherein the performing multi-layer feature extraction on the input image to obtain the plurality of feature maps comprises:

inputting the input image into the convolutional neural network and performing the multi-layer feature extraction, to obtain the plurality of feature maps.

8. An image processing apparatus, comprising:
a processor; and
a memory storing instructions that when executed by the processor configure the image processing apparatus to:
obtain an input image and a processing requirement, wherein the processing requirement is used to indicate to perform target processing on a target feature map group obtained by performing image segmentation on the input image; and
perform multi-layer feature extraction on the input image to obtain a plurality of feature maps;
downsample the plurality of feature maps to obtain a plurality of feature maps with a reference resolution, wherein the reference resolution is less than a resolution of the input image;
fuse the plurality of feature maps with the reference resolution to obtain at least one feature map group;
upsample the at least one feature map group by using a transformation matrix W, to obtain the target feature map group, wherein the target feature map group has a same resolution as that of the input image, the transformation matrix W is obtained by modeling training data of an image segmentation task, and one dimension of the transformation matrix W is the same as a quantity of channels of the feature group; and
perform the target processing on the target feature map group based on the processing requirement to obtain a target image.

9. The apparatus according to claim 8, wherein when the image processing apparatus is configured to upsample the at least one feature map group by using the transformation matrix W, to obtain the target feature map group, the image processing apparatus is specifically configured to:

calculate a product of the transformation matrix W and each of (H×W) one-dimensional matrices that each comprise C elements, to obtain (H×W) one-dimensional matrices that each comprise P elements, wherein an element comprised in any one of the (H×W) one-dimensional matrices that each comprise C elements is an element at a same location in each of C two-dimensional (H×W) matrices comprised in the feature map group, H and W are two dimensions of the feature map group, C is the quantity of channels of the feature map group, the transformation matrix is a two-dimensional (C×P) matrix obtained based on M annotated images comprised in the training data, P=A×B×N, and N is a quantity of categories into which image semantics in the M annotated images are segmented; and separately perform feature permutation on the (H×W) one-dimensional matrices that each comprise P elements, to obtain the target feature map group, wherein at least one (A×B×N) submatrix comprised in the target feature map group is obtained based on one of the (H×W) one-dimensional matrices that each comprise P elements, and H, W, C, N, P, M, A, and B are all integers greater than 0.

10. The apparatus according to claim 8, wherein when the image processing apparatus is configured to separately perform feature permutation on the (H×W) one-dimensional matrices that each comprise the P elements, to obtain the target feature map group, the image processing apparatus is specifically configured to:
  determine, based on any one of the (H×W) one-dimensional matrices that each comprise P elements, (A×B) one-dimensional matrices that each comprise N elements; and
  use, as a submatrix comprised in the target feature map group, a three-dimensional (A×B×N) matrix obtained based on the (A×B) one-dimensional matrices that each comprise N elements.

11. The apparatus according to claim 9, wherein any one of the M annotated images is a three-dimensional (H×W×N) matrix; and
  wherein the transformation matrix W is obtained by the image processing apparatus being further configured to:
  obtain at least one (A×B×N) submatrix corresponding to each of the M annotated images, to obtain a plurality of (A×B×N) submatrices;
  obtain, based on the plurality of (A×B×N) submatrices, a plurality of vectors comprising P elements, wherein a vector comprising P elements is obtained based on each of the plurality of (A×B×N) submatrices;
  perform principal component analysis on the plurality of vectors comprising P elements to obtain a two-dimensional (P×P) matrix; and
  use one (C×P) submatrix comprised in the two-dimensional (P×P) matrix as the transformation matrix W.

12. The apparatus according to claim 8, wherein when the image processing apparatus is configured to perform multi-layer feature extraction on the input image to obtain the plurality of feature maps, the image processing apparatus is specifically configured to:
  perform a convolution operation on the input image to obtain a first feature map, and perform a convolution operation on a $(K-1)^{th}$ feature map to obtain a $K^{th}$ feature map, wherein the $K^{th}$ feature map is a feature map with the reference resolution, a resolution of the $(K-1)^{th}$ feature map is not greater than that of the $K^{th}$ feature map, K is an integer greater than 1, and the plurality of feature maps comprise K feature maps; and
  wherein when the image processing apparatus is configured to downsample the plurality of feature maps to obtain the plurality of feature maps with the reference resolution, the image processing apparatus is specifically configured to:
  downsample the first feature map to obtain a feature map with the reference resolution, and downsample the $(K-1)^{th}$ feature map to obtain a feature map with the reference resolution.

13. The apparatus according to claim 9, wherein when the image processing apparatus is configured to fuse the plurality of feature maps with the reference resolution to obtain the at least one feature map group, the image processing apparatus is specifically configured to:
  stitch the plurality of feature maps with the reference resolution in a channel dimension to obtain the at least one feature map group, wherein the feature map group is a three-dimensional (H×W×C) matrix and corresponds to the C two-dimensional (H×W) matrices; and
  wherein when the image processing apparatus is configured to calculate the product of the transformation matrix W and each of the (H×W) one-dimensional matrices that each comprise the C elements, to obtain the (H×W) one-dimensional matrices that each comprise the P elements, the image processing apparatus is specifically configured to:
  calculate a product of the transformation matrix and a one-dimensional matrix corresponding to each element location in the feature map group, to obtain the (H×W) one-dimensional matrices that each comprise P elements, wherein an element comprised in a one-dimensional matrix corresponding to one element location in the feature map group is an element at a same element location in each of the C two-dimensional (H×W) matrices.

14. The apparatus according to claim 8, wherein the image processing apparatus is further configured to:
  obtain the transformation matrix W;
  process a training sample by using a convolutional neural network, to obtain an image segmentation result of the training sample, wherein the training sample is comprised in the training data;
  determine, based on the image segmentation result of the training sample and a standard result corresponding to the training sample, a loss corresponding to the training sample, wherein the standard result is a result expected to be obtained by processing the training sample by using the convolutional neural network; and
  update a parameter of the convolutional neural network by using an optimization algorithm and the loss corresponding to the training sample; and
  wherein when the image processing apparatus is configured to perform multi-layer feature extraction on the input image to obtain the plurality of feature maps, the image processing apparatus is specifically configured to:
  input the input image into the convolutional neural network and perform the multi-layer feature extraction, to obtain the plurality of feature maps.

15. A non-transitory computer-readable storage medium, wherein the non-transitory computer-readable storage medium stores a computer program, the computer program comprises a program instruction, and when the program instruction is executed by a processor, the processor is configured to perform steps comprising:
  obtaining an input image and a processing requirement, wherein the processing requirement is used to indicate to perform target processing on a target feature map group obtained by performing image segmentation on the input image;
  performing multi-layer feature extraction on the input image to obtain a plurality of feature maps;
  downsampling the plurality of feature maps to obtain a plurality of feature maps with a reference resolution, wherein the reference resolution is less than a resolution of the input image;
  fusing the plurality of feature maps with the reference resolution to obtain at least one feature map group;
  upsampling the at least one feature map group by using a transformation matrix W, to obtain the target feature map group, wherein the target feature map group has a same resolution as that of the input image, the transformation matrix W is obtained by modeling training data of an image segmentation task, and one dimension of the transformation matrix W is the same as a quantity of channels of the feature group; and
  performing the target processing on the target feature map group based on the processing requirement to obtain a target image.

* * * * *